US008037953B2

(12) United States Patent
Puskar-Pasewicz et al.

(10) Patent No.: US 8,037,953 B2
(45) Date of Patent: Oct. 18, 2011

(54) POWERED WHEELCHAIR HAVING A SIDE-ACCESS BATTERY COMPARTMENT

(75) Inventors: John Puskar-Pasewicz, Shavertown, PA (US); Kip D. Alder, West Pittston, PA (US); Philip Hau Leung Lam, Burnaby (CA)

(73) Assignee: Pride Mobility Products Corporation, Exeter, PA (US)

(*) Notice: Subject to any disclaimer, the term of this patent is extended or adjusted under 35 U.S.C. 154(b) by 0 days.

(21) Appl. No.: 11/550,147

(22) Filed: Oct. 17, 2006

(65) Prior Publication Data

US 2007/0181353 A1 Aug. 9, 2007

Related U.S. Application Data

(60) Provisional application No. 60/727,536, filed on Oct. 17, 2005.

(51) Int. Cl.
*B60K 1/04* (2006.01)

(52) U.S. Cl. ........................ 180/65.1; 180/68.5; 180/907

(58) Field of Classification Search ................. 180/65.1, 180/907, 55, 68.5; 280/250.1, 647, 650, 280/65.1, 907, 55, 641, 47.38, 657
See application file for complete search history.

(56) References Cited

U.S. PATENT DOCUMENTS 3,794,132 A * 2/1974 Moon ............................ 180/13
3,807,520 A * 4/1974 Chisholm ...................... 180/6.5
3,952,822 A * 4/1976 Udden et al. .................. 180/216
4,566,551 A * 1/1986 Feliz ............................ 180/9.1
5,042,607 A * 8/1991 Falkenson et al. ............ 180/208
5,094,310 A * 3/1992 Richey et al. ................ 180/65.6
5,156,225 A * 10/1992 Murrin ......................... 180/65.1
5,156,226 A * 10/1992 Boyer et al. ................. 180/65.1
5,351,774 A 10/1994 Okamoto ..................... 180/65.1
5,435,404 A * 7/1995 Garin, III ....................... 180/6.5
5,664,266 A 9/1997 Williams et al. ................. 5/86.1
5,778,996 A * 7/1998 Prior et al. ................... 180/65.1
5,964,473 A * 10/1999 Degonda et al. ........... 280/250.1
6,202,773 B1 * 3/2001 Richey et al. .................. 180/6.5
6,341,657 B1 * 1/2002 Hopely et al. ................. 180/6.5
6,375,209 B1 * 4/2002 Schlangen ................. 280/250.1
6,439,634 B1 * 8/2002 Jensen et al. ................. 296/37.6
6,450,867 B1 * 9/2002 Legatt ........................... 451/350
6,601,863 B1 8/2003 Mentessi et al. ........... 280/304.1
6,640,916 B2 * 11/2003 Schaffner et al. ............ 180/65.1
6,923,278 B2 * 8/2005 Mulhern et al. ............. 180/65.1
2001/0011613 A1 * 8/2001 Schaffner et al. ............ 180/65.1
2003/0089537 A1 * 5/2003 Sinclair et al. ............... 180/65.1
2004/0251063 A1 * 12/2004 Patterson et al. ............ 180/65.1
2005/0000742 A1 1/2005 Mulhern et al. ............. 180/65.5
2005/0077698 A1 * 4/2005 Grymko et al. ............... 280/208

* cited by examiner

*Primary Examiner* — John Walters
(74) *Attorney, Agent, or Firm* — Woodcock Washburn LLP

(57) ABSTRACT

A wheelchair includes a frame, a chair, a pair of drive wheels, a pair of rear wheels, and a pair of from wheels. Each front wheel is part of a front arm assembly that is rigidly coupled to a drive via a mounting plate. The mounting plate is connected to the wheelchair frame by a pivot. The drives are transversely mounted. The batteries are disposed rearward of the drives. The wheelchair seat can be moved forward to provide access to the batteries without fully removing the wheelchair from the frame. Or the wheelchair may provide side access to the batteries and the wheelchair may be fixed.

18 Claims, 30 Drawing Sheets

POWERED WHEELCHAIR HAVING A SIDE-ACCESS BATTERY COMPARTMENT

CROSS-REFERENCE TO RELATED APPLICATIONS

This application claims priority under 35 U.S.C. §119(e) to U.S. provisional application No. 60/727,536 filed Oct. 17, 2005, which is incorporated by reference herein in its entirety.

FIELD OF THE INVENTION

The present invention relates to powered wheelchairs, and more specifically powered wheelchair configurations enabling side access.

BACKGROUND OF THE INVENTION

Powered wheelchairs often have six wheels including a pair of center wheels, a pair of rear wheels, and a pair of front wheels. Typically, one pair of wheels is driven by, and directly connected to, a drive. The front wheels may be suspended above the ground surface, are fixed except for the capability of turning about their axis of rotation; such wheels are referred to herein as "fixed wheels." Wheels that are configured to ride on the ground surface during normal operation typically have the capability to swivel about a vertical axis; such wheels are referred to herein as "castors."

Wheelchairs that employ fixed wheels often employ springs to suspend the fixed wheels above the ground at the end of forward extending arms. The fixed wheels are the first part of the wheelchair that contact an curb, and the fixed wheels are configured to ride over a curb.

Wheelchairs that employ castors often are disposed on forward-extending arms that are coupled to the frame at a pivot. Some wheelchairs, such as those employing an Active-Track™ suspension, available on some powered wheelchairs from Pride Mobility Products Corporation, have pivoting front castor arms that raise in response to wheelchair acceleration or motor torque to enhance the capability of the wheelchair to climb curbs. Pivotable front castor arms typically employ biasing springs to provide a downward force that is balanced against the drive's capability to raise the castors for ascending a curb and that urges the castors downward to contact the lower ground surface while descending a curb.

Wheelchairs typically have a frame onto which loads from the passenger and the wheelchair's batteries are applied. To properly distribute the load between the center wheels and the rear castors (and where applicable the front castors) and to enhance stability of the wheelchair, loads from the batteries and passenger typically are applied between the axis of rotation of the center wheels and the rear castors, especially where the center wheels are the drive wheels. Often, the batteries are located such that their center of gravity is near, but rearward of, the center drive wheels or in general near the center of the wheelchair. To accommodate the battery location, the drive for each drive wheel typically includes a longitudinally oriented (that is, oriented parallel to the axis of straight-ahead movement of the wheelchair) motor and a right-angle gearbox. An exception to such drive and battery configuration is shown in U.S. Pat. No. 5,964,473 ("Degonda"), which discloses a transversely oriented motor that splits the battery compartment.

Because the conventional location of the battery compartment is at least partly underneath the passenger chair, the chair may be required to be removed to access the batteries.

SUMMARY OF THE INVENTION

A powered wheelchair includes a battery compartment having a side opening and a removable cover. The wheelchair includes a frame; a pair of opposing drives; a pair of drive wheels; and a power supply compartment that is generally located behind the drives. The compartment has a side opening through which a power supply may be removed. A chair is supported on the frame such that the side opening of the compartment is accessible and such that the power supply may be removed without removing the chair from the frame. Each drive includes a substantially-transversely mounted motor and gearbox, and each one of the drive wheels is coupled to a corresponding one of the drives. The power supply preferably is two or more batteries. The present invention also encompasses a method of removing a battery via the side access.

Preferably, the wheelchair includes a cover that has an first position in which cover is generally located over the side opening of the compartment and a second position in which the cover is spaced apart from the side opening to enable access thereto. The cover is removable from the compartment. Preferably, the compartment has an upwardly extending lip on its lower edge proximate the side opening. The cover includes a panel portion that is approximately the same size as the side opening, and has a groove on its lower edge that engages the lip while the cover is in its first position.

As described below, the wheelchair preferably has a drive arrangement in which the gearbox is a single reduction gearbox, and the batteries are generally located to the rear of the drives. And preferably, every portion of the batteries is located to the rear of the centerline of the drive wheel axis, and preferably, every portion of the batteries is located to the rear of the drives.

The chair preferably is supported on the frame by a single post that attaches to the frame at a point that is behind a centerline of the drives, and preferably at a point that is rearward of a centerline of the drives and forward of a compartment.

The preferred wheelchair in which the above configuration is employed is more fully described below. The wheelchair may be of the type having a pair of drives operatively coupled to the drive wheels, each one of the drives including a motor and a gearbox, each one of the drives being pivotally coupled to the frame only at a single pivot axis; a forward-extending, front arm rigidly coupled to the drive assembly; and a front wheel rotatably coupled the front arm, a centerline of the pivot axis has a vertical height that is approximately the same or less than the vertical height of an axis of rotation of the front wheel. A drive mount to which the drive is rigidly coupled may be coupled to the frame at the pivot axis.

The drive mount may be a mounting plate to which the drive and the front arm are affixed, and it may include a substantially-upright planar surface that is substantially perpendicular to an axis of rotation of the drive wheels.

Each one of the drives may have a longitudinal centerline that is parallel to an axis of rotation of the corresponding drive wheel. Preferably, each drive includes a DC motor and a single-reduction gearbox.

The front wheel may be a castor such that the castor is in contact with a support surface while the wheelchair is at rest such that the front arm is not biased by a spring. Alternatively, the front wheel may be an anti-tip wheel such that the anti-tip wheel, in its rest position, is spaced apart from a support surface. The anti-tip wheel may be supported by a spring in its rest position. A spring may be coupled between the frame and one of the drives or a mounting plate of the drive to suspend the anti-tip wheel in its rest position.

Preferably, each drive is oriented substantially transverse to the direction of wheelchair translation. And the wheelchair includes a power source, such as batteries, for supplying power to the motor. The power source is disposed to the rear of the drives. For example, the entire power source may be disposed to the rear of the centerline of the drive wheel axis, or essentially every portion of the power source may be disposed to the rear of the drives. The batteries preferably are located in a power source compartment or battery compartment that is disposed to the rear of the drives.

The weight of the chair assembly may be transmitted to the frame at a point between the drives and the power source And the pivot axis may be disposed forward of the axis of rotation of the drive wheels. Preferably, the pivot axis is spaced apart from the front wheel axis by a horizontal dimension that is between 40% and 65%, more preferably 45% and 60% and even more preferably approximately 54%, of the horizontal dimension between the drive wheel axis and the front castor axis. The pivot axis may be located forward of the drive wheel axis such that the front castors bear between 20% and 50% of the wheelchair load measured with the chair at rest on a level, flat surface without a passenger.

A method of ascending an obstacle, such as a curb, in a powered wheelchair is provided that comprises the steps of: (a) providing a wheelchair that includes: a frame; a pair of opposing drive wheels and at least one rear wheel; each side of the wheelchair including: a drive including a motor and a gearbox, the drive being pivotally coupled to the frame only at a single pivot axis; a forward-extending, front arm rigidly coupled to the drive assembly; and a front wheel rotatably coupled the front arm, a centerline of the pivot axis has a height that is approximately the same or less than the vertical height of an axis of rotation of the front wheel; (b) positioning the wheelchair such that the front wheels are in contact with or in close proximity to an obstacle that has a height measure from a support surface that is approximately equal to or less than the height of the front wheel axis of rotation; and (c) urging the wheelchair forward to enable the front wheels to ascend the obstacle.

A user may apply a forward, horizontal force from the wheelchair drive that forms a moment with the reaction force from a contact surface of the obstacle, thereby enabling the front wheels to ascend the obstacle. The pivot may move upwardly as the front wheel ascends the obstacle and the frame may pitch upwardly as the front wheel ascends the obstacle. After the force is applied and after the front wheel has ascended the obstacle and before the drive wheel has ascended the obstacle, the frame may pitch rearward compared to its position in position step (b).

The wheelchair may also include a frame; a pair of opposing drives including a substantially-transversely mounted motor and gearbox; a pair of drive wheels, each one of the drive wheels coupled to a corresponding one of the drives; and a chair assembly supported on the frame and being moveably coupled thereto such that the chair is forwardly moveable to enhance access to a power supply portion, such as a battery portion, of the wheelchair without fully removing the chair from the frame. The batteries may be disposed rearward of the chair support.

The chair may be supported on the frame by a single post to which the chair assembly is mounted. The chair assembly may include a seat and a hinge coupled to the seat such that the seat is forwardly moveable by pivoting about the hinge, and a stud and retainer having a slot formed therein such that stud is slideable in the slot and lockable to retain the chair in a forward position. The chair assembly may be biased toward a forward position and be capable of being retained in a lower position by a pin. The chair assembly may also include a latch mechanism including a handle and a cam that retains the chair in lower, operational position, the cam being releasable upon actuation of the handle. The chair assembly may also include a seat and a slide coupled to the seat such that the seat is forwardly moveable by sliding.

The wheelchair may comprise a frame; a pair of drive wheels and at least one rear wheel; and a pivoting assembly including a drive assembly and a front arm assembly, the drive assembly is (i) transversely mounting relative to the frame, (ii) operatively coupled to one of the drive wheels and (iii) pivotally connected to the frame, the front arm assembly includes a front wheel rotatably coupled to an arm, the front arm assembly is rigidly coupled to the drive assembly, whereby the drive assembly and front arm assembly pivot in unison about the pivotal connection upon encountering an obstacle.

The front wheel may be an anti-tip wheel that is suspended from a ground surface on which the wheelchair travels, and include a suspension capable of acting on the arm. Alternatively the front wheel may be a castor wheel that is normally in contact with the ground surface on which the wheelchair travels. A centerline a pivot axis of the pivotal connection between the drive assembly and the frame may have a vertical height that is approximately the same or less than the vertical height of an axis of rotation of the front wheel.

The drive assembly may include a motor and a reduction gearbox that is oriented such that motor has a longitudinal axis that is transverse relative to the frame. The drive assembly includes a mount to which the gearbox is affixed, and the mount includes a surface to which the front arm is rigidly affixed. Preferably, the mounting is a vertical plate. In this configuration, a battery compartment is located rearward of the drive, and a chair is coupled to the frame such that it is forwardly movable to enable access to the battery compartment without removing the chair from the frame.

DETAILED DESCRIPTION OF ILLUSTRATIVE EMBODIMENTS

Figure 1:
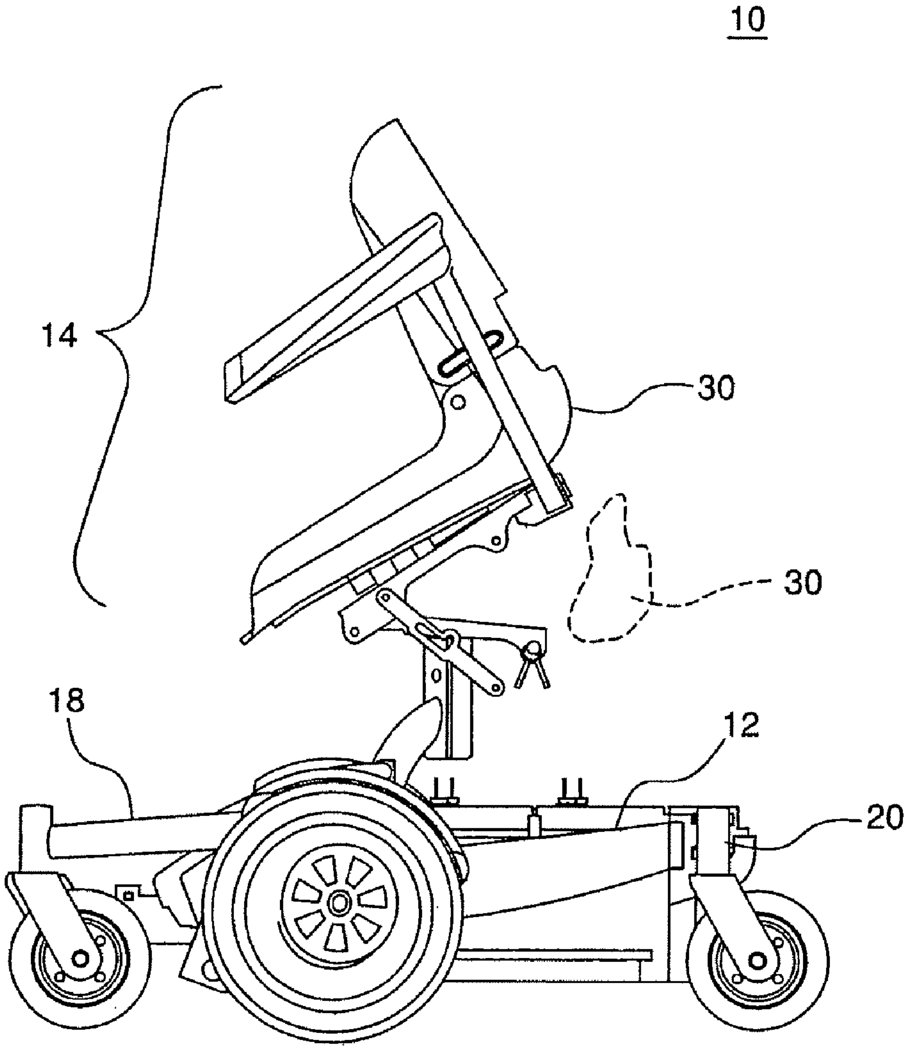
FIG. 1 is a side view of an embodiment of a wheelchair illustrating aspects of the present invention.
Figure 2:
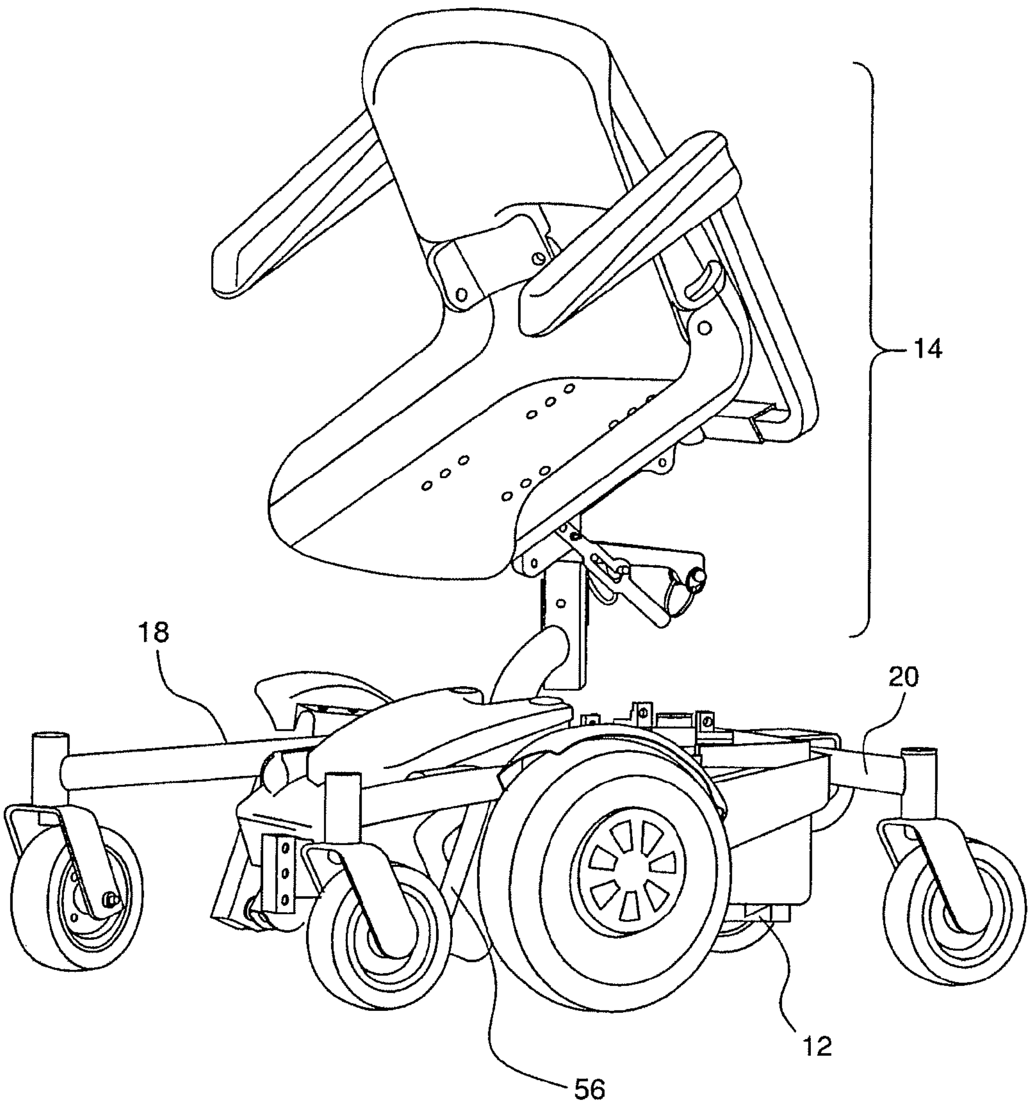
FIG. 2 is a perspective view of the wheelchair shown in FIG. 1.

Two embodiments of a wheelchair are disclosed herein to illustrate aspects of the wheel chair consistent with the present invention. A first embodiment wheelchair 10 is shown in FIG. 1 through FIG. 5. A second embodiment wheelchair 10' is shown in FIGS. 7A, 7B, 8A, and 8B. Two configurations for enabling battery access in the wheelchair embodiments are provided.

First embodiment wheelchair 10 includes a frame assembly 12, a chair assembly 14, a drive assembly 16, a front pivot assembly 18, and a rear wheel assembly 20. Frame assembly 12 in the embodiment shown is a box-like structure that is formed of welded and/or bolted square and round tubing and formed plates. The frame structure, which is generally referred to herein by reference numeral 24, includes a central support 25*a*, a rear support 25*b*, a T-shaped support 25*c*, a pair of pivot supports 25*d*, and a footrest support 25*e*. Frame 24 is generally rigid, even though the present invention encompasses frames having joints for enhancing the suspension or any other reason.

Figure 3A:
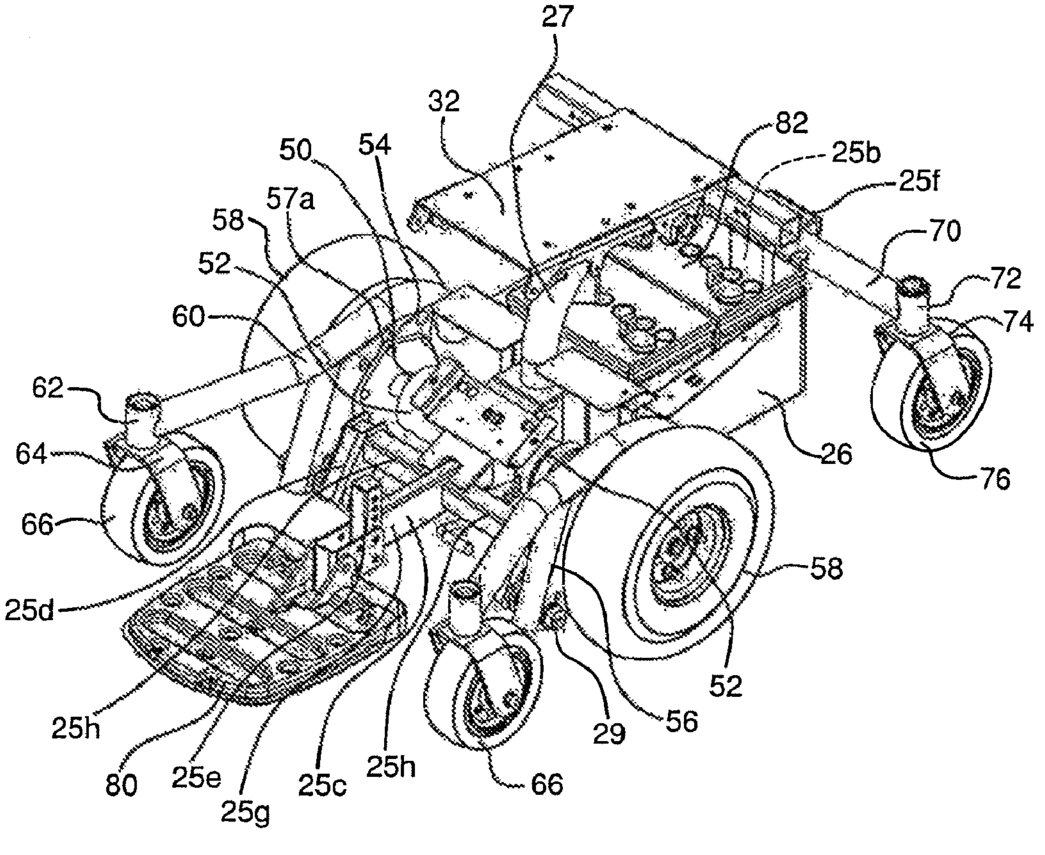
FIG. 3A is a perspective view of the wheelchair shown in FIG. 1 with portions of the chair assembly and cover removed.
Figure 3B:
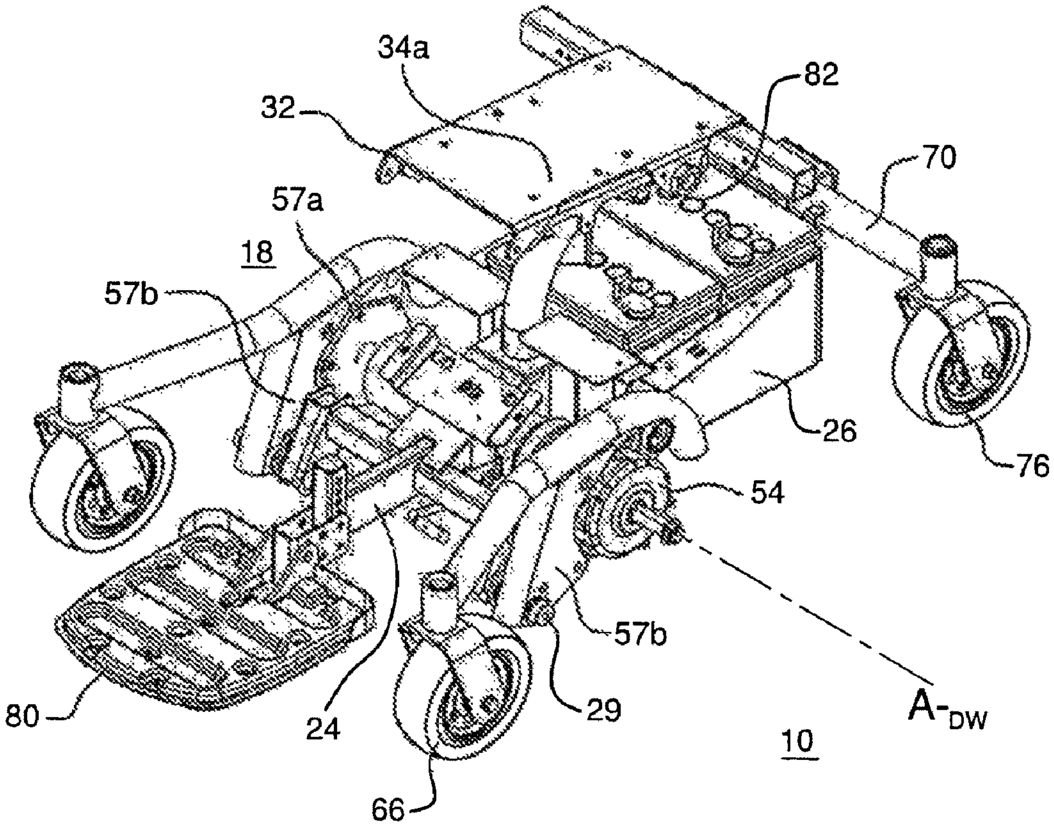
FIG. 3B is a perspective view of the wheelchair as shown in FIG. 3A with the drive wheels and a portion of the mounting plate removed.
Figure 4A:
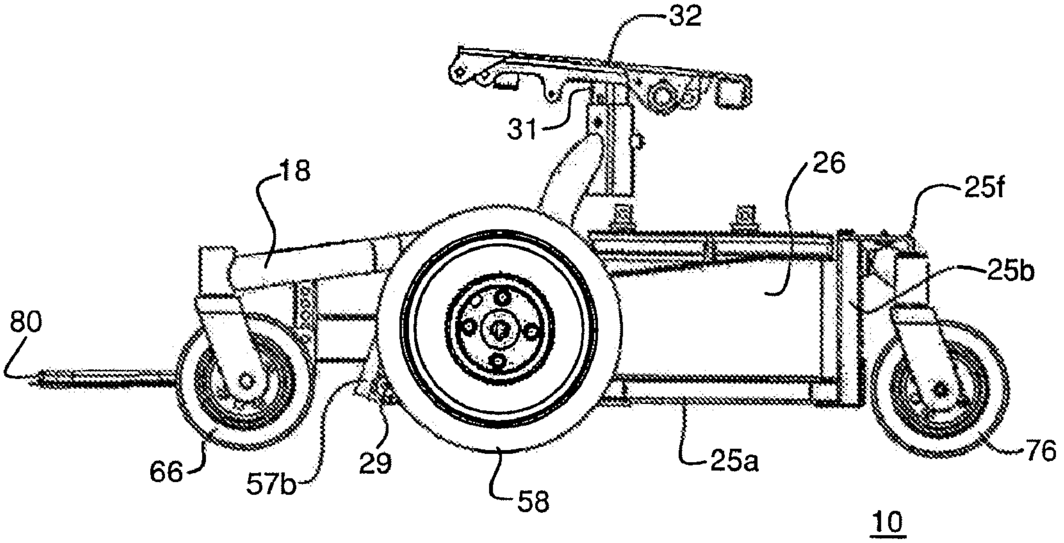
FIG. 4A is a side view of the wheelchair shown in FIG. 1 with portions of the chair assembly and cover removed.
Figure 4B:
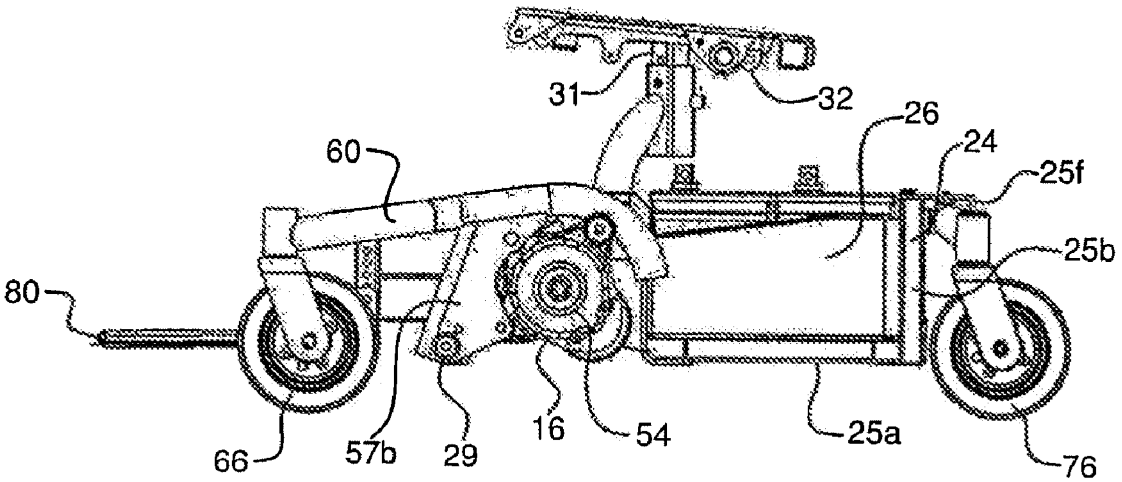
FIG. 4B is side view of the wheelchair as shown in FIG. 4A with the drive wheel and a portion of the mounting plate removed.
Figure 5:
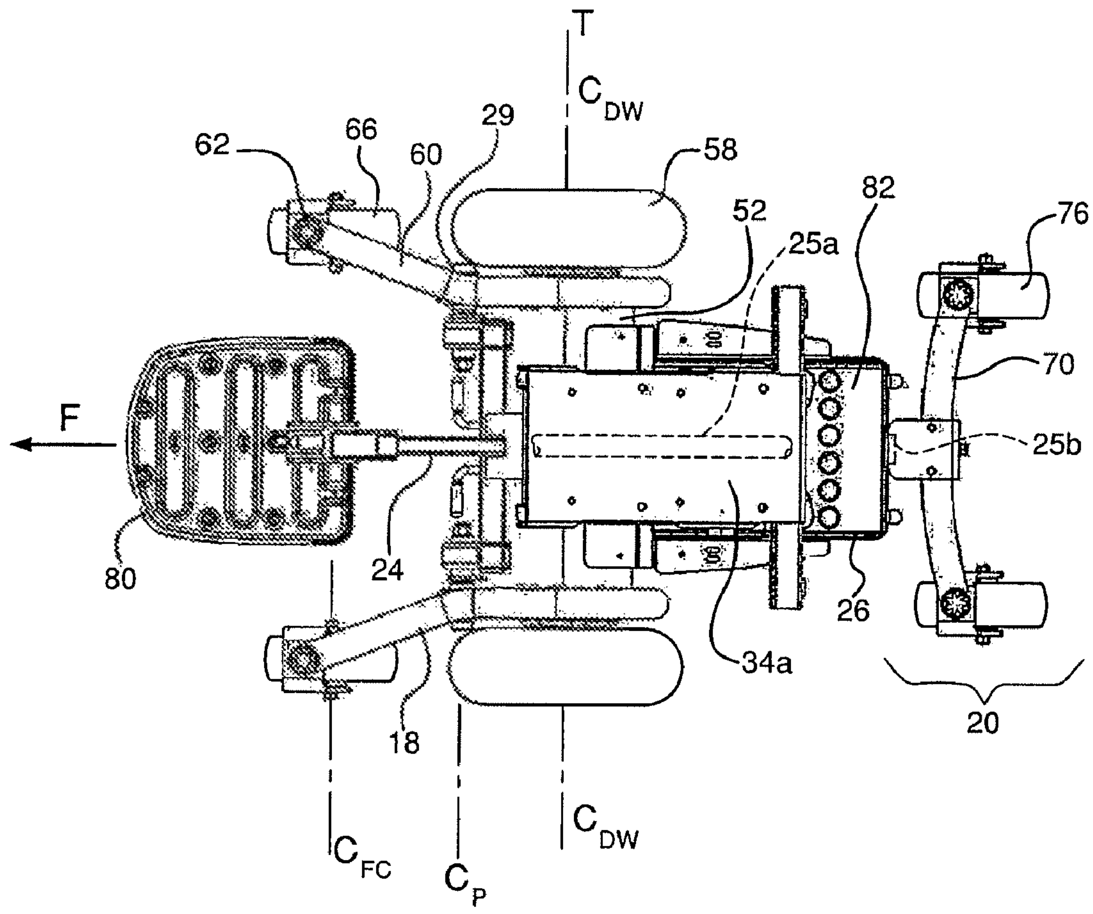
FIG. 5 is a top view of the wheelchair shown in FIG. 1 with portions of the chair assembly and cover removed.

Central support 25*a*, which is best shown in FIGS. 3A, 3B, and 4B, is disposed along a horizontal centerline of the wheelchair 10. Central support is shown in FIGS. 4A and 4B, and partially shown schematically in dashed lines in FIG. 5. Rear support 25*b*, which is shown in FIGS. 4A and 4B, and schematically in dashed lines in FIGS. 3A and 5, extends upwardly from a rear portion of central support 25*a* and includes a mounting plate 25*f*. T-shaped support 25*c* is disposed above and forward of central support 25*a* and includes a longitudinal portion 25*g* and a pair of transverse supports 25*h*. Pivot supports 25*d* extend generally downwardly from transverse supports 25*h*. Footrest support 25*e* is disposed at a forward end of longitudinal portion 25*b* of T-shaped support 25*c*. A footrest 80 is coupled to footrest support 25*e*.

Figure 6A:
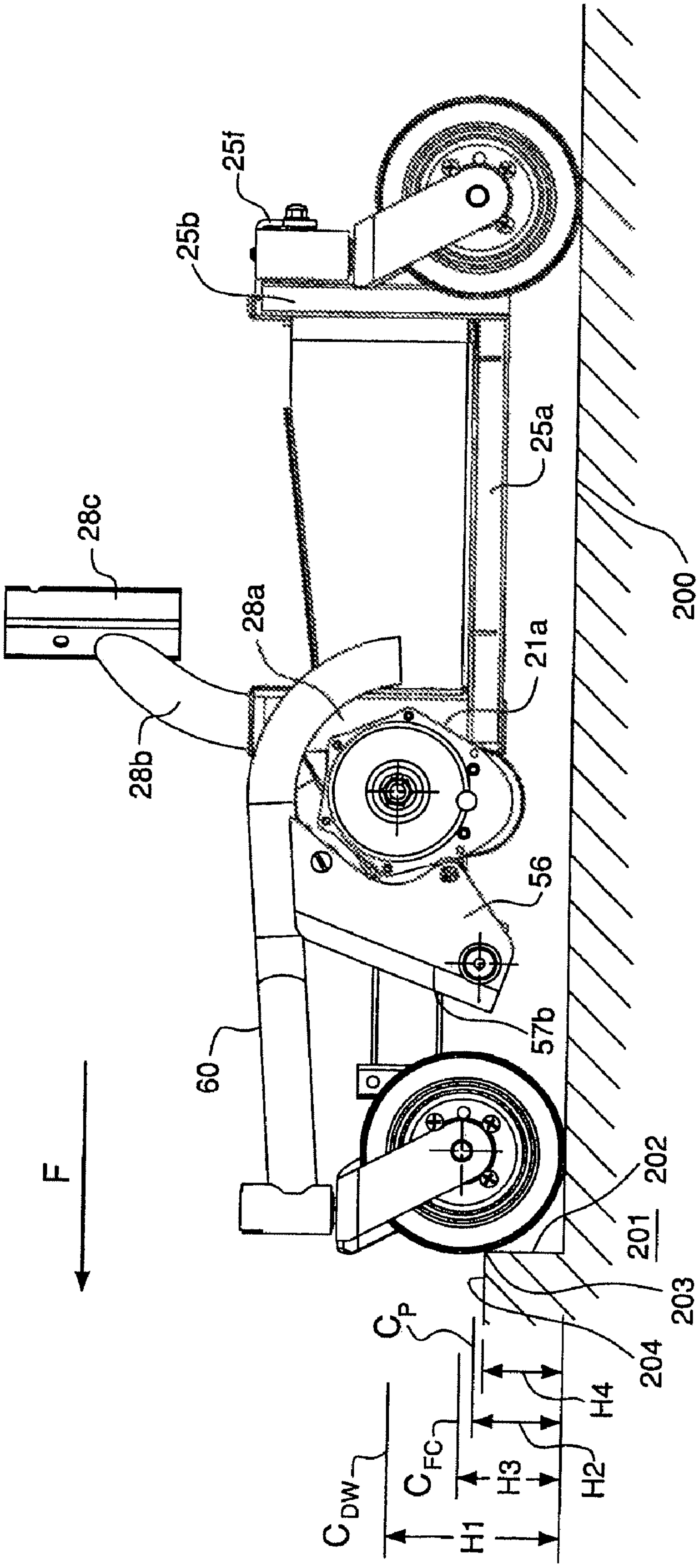
FIG. 6A is a side view of the wheelchair shown in FIG. 1 on a level ground surface with the cover, drive wheel, and a portion of the mounting plate removed.

A housing 26 for holding batteries 82 or other power source is bolted or welded to frame 24. A chair support, such as support post 27, extends upwardly from frame 24. Support post 27 may be integrally formed as a portion of frame 24 or may be a separate structure. Support post 27, as best shown in FIG. 6A, includes a substantially upright portion 28*a*, a backwardly curved portion 28*b*, and an upright square tube 28*c*.

Figure 11:
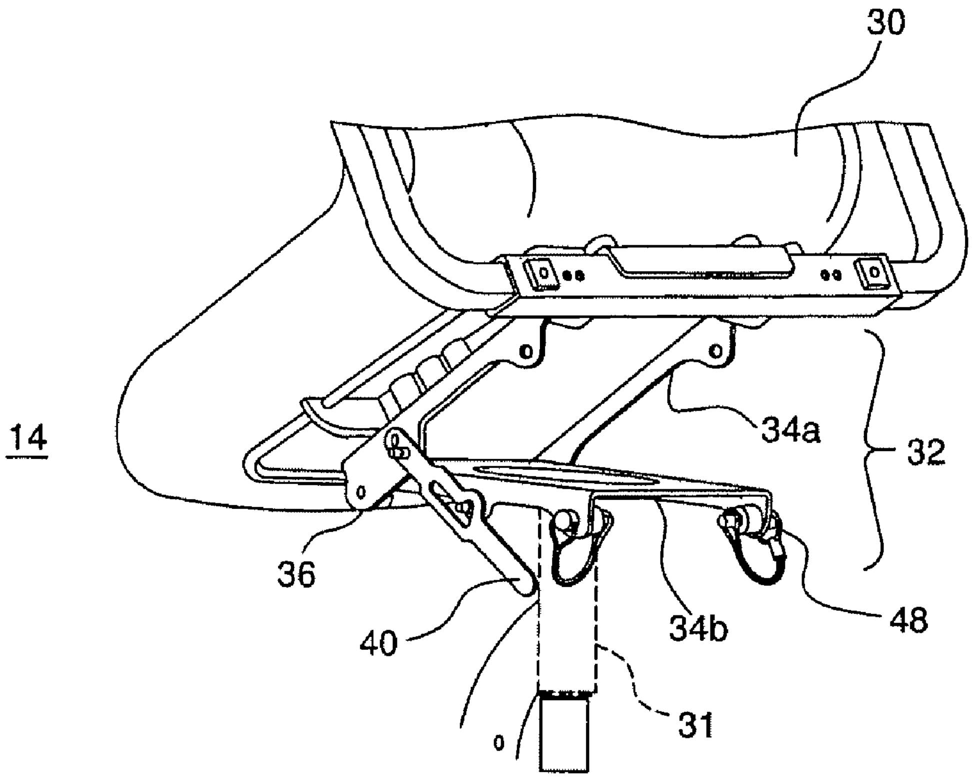
FIG. 11 is a perspective view of a portion of the chair assembly showing the chair in its forward-most position.
Figure 12:
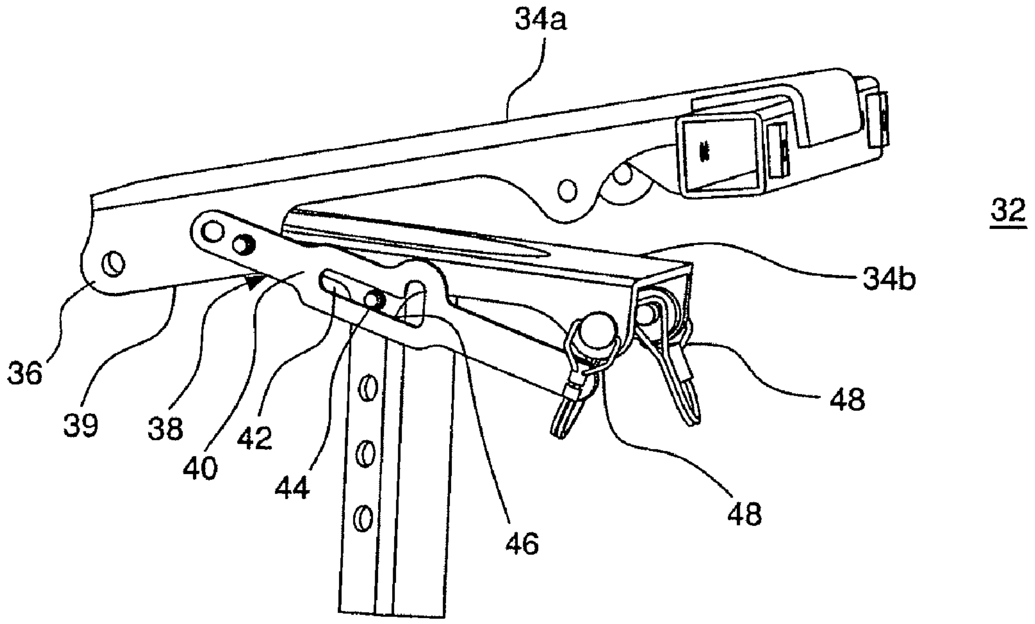
FIG. 12 is a perspective view of a moveable portion of the chair assembly corresponding to the chair being in an intermediate position.
Figure 13:
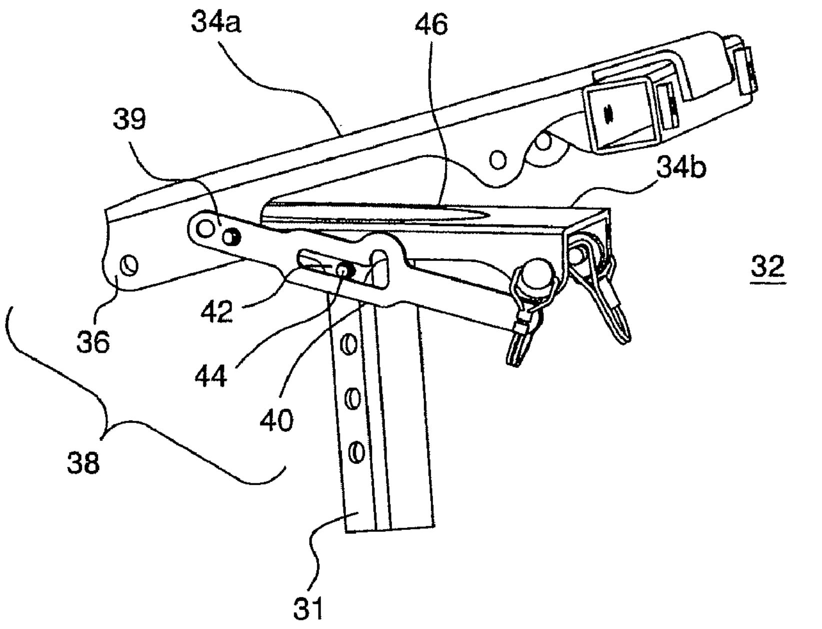
FIG. 13 is a perspective view of the moveable portion of the chair assembly corresponding to the chair being in its forward-most position.

According to a first configuration for enabling battery access, chair assembly 14 includes a seat 30 for holding the wheelchair passenger, a seat post 31 for insertion into tube 28*c* of support post 27, and a hinge assembly 32 for enabling the seat 30 to pivot forward. Hinge assembly 32 enables seat 30 to pivot relative to seat post 31. As best shown in FIG. 11 through FIG. 13, hinge assembly 32 includes a pair of plates or brackets 34*a* and 34*b*, and a hinge or pivot 36.

To retain the seat in its forward-most position, which is shown in FIG. 11 and FIG. 13, a retainer assembly 38 includes a retainer plate 40 having a slot 42, a stud 44, and a detent recess 46. Retainer plate 40 preferably is attached to upper bracket 34*a* by a pivot 39. Stud 44 preferably is affixed to lower bracket 34*b* and disposed to slide within slot 42. Detent recess 46 is formed in retainer plate 40 as an extension of slot 42. Stud 44 can slide into the recess 46 to temporarily and releasably lock seat 30 in its forward-most position. This locking mechanism can be released by moving the retainer plate 40 by hand such that stud 44 is disposed into the long slotted portion of slot 42, which enables stud 44 to slide in slot 42 to enable seat 30 to return to its ready position for use by a passenger The ready position is shown schematically in dashed lines in FIG. 1. A pair of pins 48 are provided for manually locking brackets 34*a* and 34*b* together to prevent seat 30 from pivoting forward and keep seat 30 in its ready position.

Figure 15:
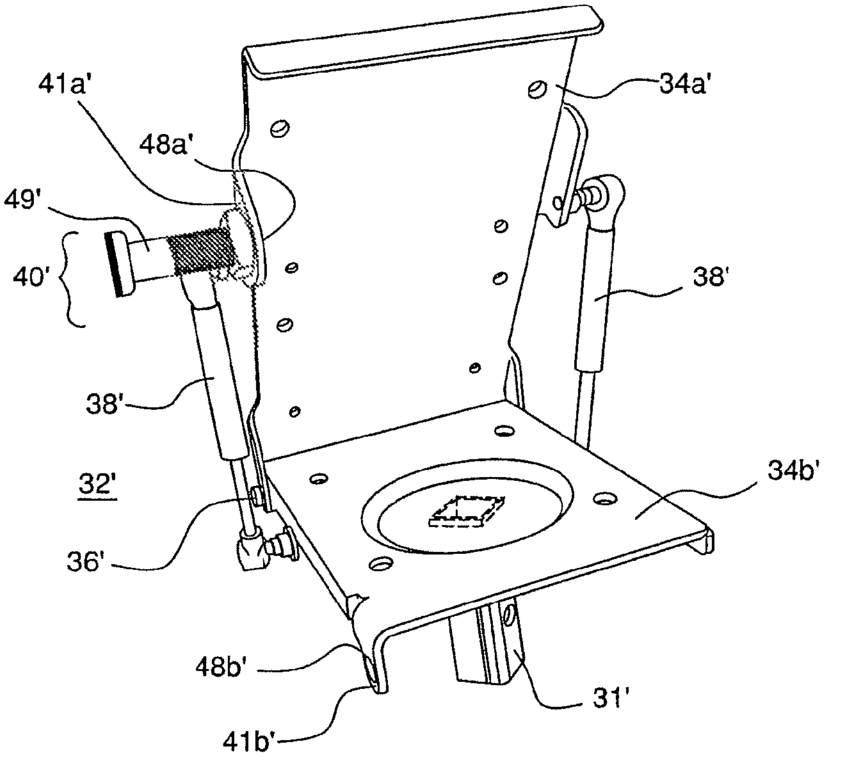
FIG. 15 is a perspective view of the embodiment shown in FIG. 14 showing the chair in a forward-most position.
Figure 14:
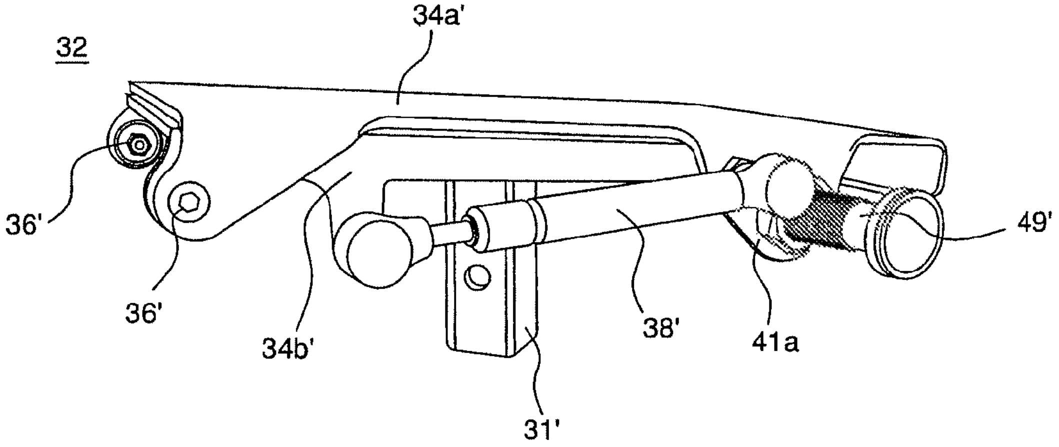
FIG. 14 is a perspective view of another embodiment of a moveable portion of the chair assembly shown in a lower or operational position.

Referring to FIGS. 14 and 15 to illustrate another assembly to enable a seat 30 (not shown in FIGS. 14 and 15 for convenience of illustration) to move forward, a hinge assembly 32' is coupled to a seat post 31'. Hinge assembly 32' includes an upper mounting plate or bracket 34*a*' and a lower mounting plate or bracket 34*b*'. Plates 34*a*' and 34*b*' are connected at front portions thereof by a hinge or pivot 36'. A pair of gas or spring-loaded cylinders 38', which are biased toward the extended position, are connected between the two plates to urge upper bracket 34*b*' toward its forward-most position, as shown in FIG. 15. Preferably, cylinders 38' provide enough force to retain seat 30 in its forward position such that a person can by hand lower seat 30 against the force of cylinders 38'.

Also, cylinders 38' are oriented and chosen such that force tending move chair 30 from its lowermost position does not create a personnel risk. In general, cylinders 38' preferably assist in the raising of chair 30.

A latch mechanism 40' holds lower bracket 34*b*' in its rearward-most or lower-most position, in which upper bracket 34*a*' rests on lower bracket 34*b*', and is coupled to an ear or flange 41*a*' on upper plate 34*a*'. The lower-most position is shown in FIG. 14. Latch mechanism 40' includes a retractable pin 48*a*', which preferably may be spring loaded or, alternatively, retractable by threading onto threads fixed onto one of the brackets. As best shown in FIG. 15, pin 48*a*' is housed in a body 49', which is affixed to an ear or flange 41*a*' that extends from upper bracket 34*a*'. Body 49' preferably is threaded onto a nut that is affixed to flange 41*a'*.

Lower bracket 34*b*' includes connections for cylinders 38', a connection for seat post 31', and a downwardly projecting ear or flange 41*b*'. Flange 41*b*' preferably has a curved portion that forms a smooth transition between a substantially vertical portion of flange 41*b*' and the major surface of bracket 34*b*'. Thus, when upper bracket 34*a*' is lowered onto lower bracket 34*b*', pin 48*a*' contacts the curved portion of flange 41*a*' and gradually retracts. Pin 48*a*' aligns with a hole 48*b*' formed in flange 41*a*' when upper bracket 34*a*' is fully engaged with lower bracket 34*b*'. Pin 48*a*' then extends into hole 48*b*' to retain upper bracket 34*b*' onto lower bracket 34*a'*.

Figure 16:
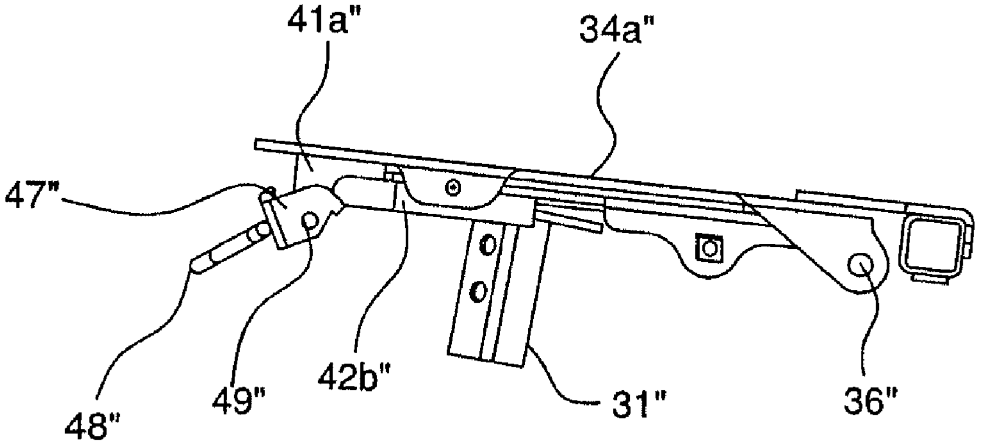
FIG. 16 is a side view of another embodiment of a moveable portion of the chair assembly shown in its lower or operational position.
Figure 17:
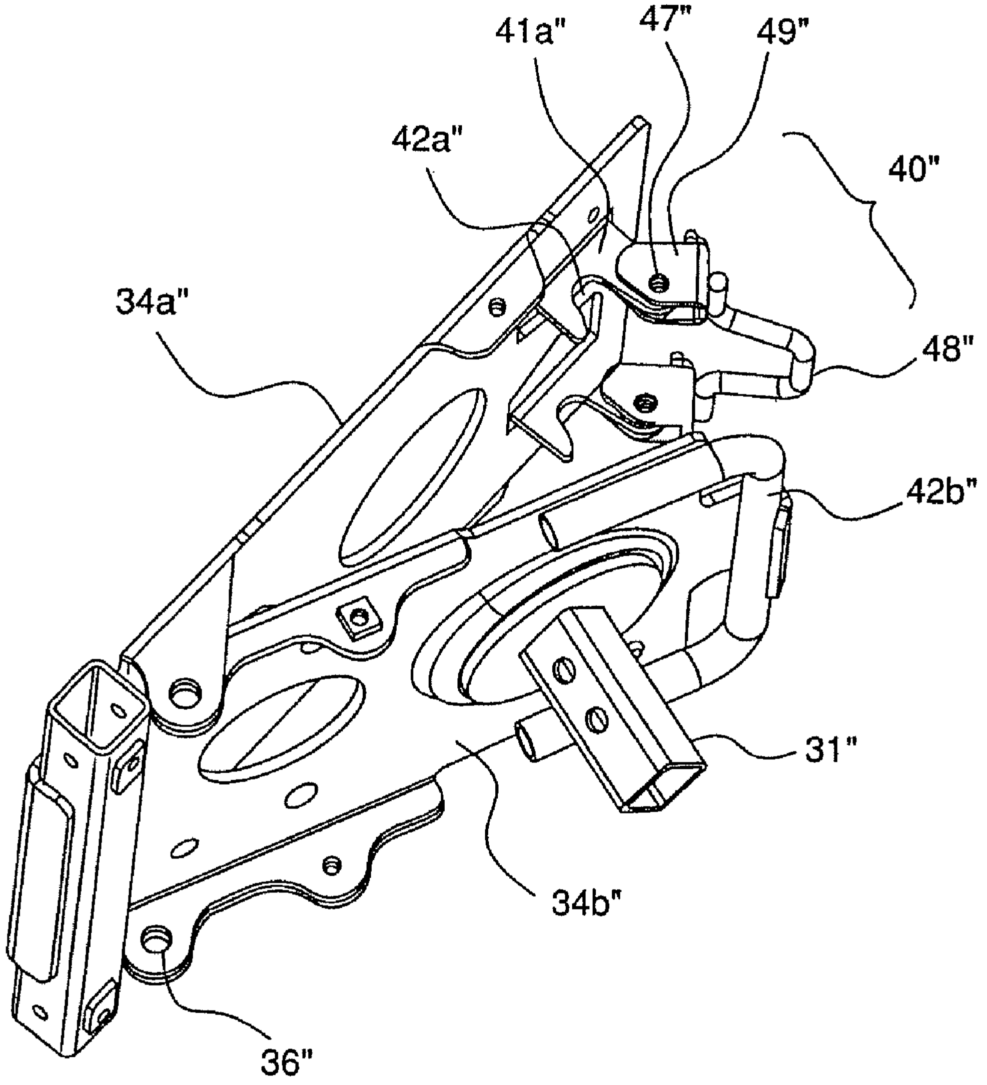
FIG. 17 is a perspective view of the underside of the embodiment shown in FIG. 16, but shown in its open configuration that corresponds to the chairs' forward most position.

FIGS. 16 and 17 show an alternative embodiment of the assembly that enables seat 30 (not shown in FIGS. 16 and 17 for clarity) to move foreword. The brackets 34*a*" and 34*b*" of the embodiment of FIGS. 16 and 17 are similar to those shown in FIGS. 14 and 15 except latch mechanism 40' (and its cooperating structure) is omitted in favor of a locking handle 40" (and its cooperating structure) that is employed to retain upper bracket 34*a*" and lower bracket 34*b*" together. In this regard, upper bracket 34*a*"includes a pair of tabs 41*a*" that form a slot 42*a*". In its lower position, slot 42*a*" receives an alignment bar 42*b*" that is part of lower bracket 34*b*". Brackets 34*a*" and 34*b*" are coupled together by a hinge or pivot 36".

Locking handle 40" includes a handle portion 48" and a pair of cam portions 49" that are connected to tabs 41*a*" via a hinge 47". In the lower position, shown in FIG. 16, can portions 49" engage alignment bar 42*b*" to retain brackets 34*a*" and 34*b*" together. Upward rotation of handle mechanism 40" disengages cam portions 49" from alignment bar 42*b*" and enables upper bracket 34*a*" to move upward relative to lower bracket 34*b*". Preferably, air cylinders, as shown in FIGS. 14 and 15 (not shown in FIGS. 16 and 17), are connected between brackets 34*a*" and 34*b*" to urge seat 30 toward its forward-most position (or more preferably to aid in the manual raising of seat 30 toward its forward-most position), and to retain it in the forward-most position, until manually returned to its lower position.

Figure 18:
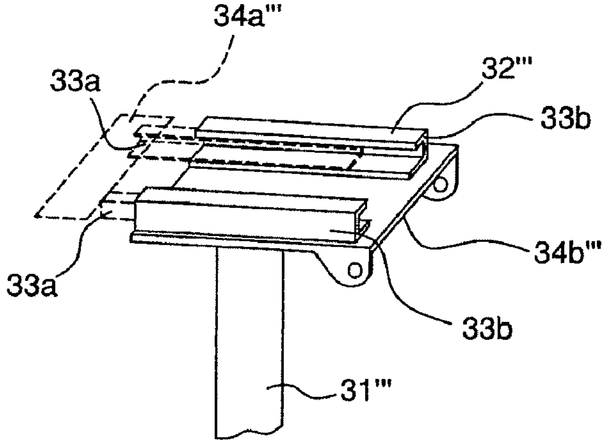
FIG. 18 is a perspective view of another embodiment of a moveable portion of the chair assembly.

Referring to FIG. 18 to illustrate another embodiment of an assembly to enable a seat 30 to move forward, a slide assembly 32'" is mounted onto a lower chair assembly bracket 34*b*". A corresponding upper chair assembly bracket 34*a*'", which is shown schematically in dashed lines, is rigidly coupled to a chair 30 (not shown in FIG. 18). A pair of slides enables upper bracket 34*a*'" to slide on lower bracket 34*b*'", which is affixed to a support 31. Support post 27'" is generally identical to post 27 described above.

Each one of the pair of slides includes a slide member 33*a* that is fixed to the upper bracket 34*a*'" and a cooperating slide member 33*b* that is fixed to the lower bracket 34*b*'". Slide members 33*a* and 33*b* may have any configuration that will enable seat 30 to slide relative to lower bracket 34*b*'", including conventional slides.

Figure 19:
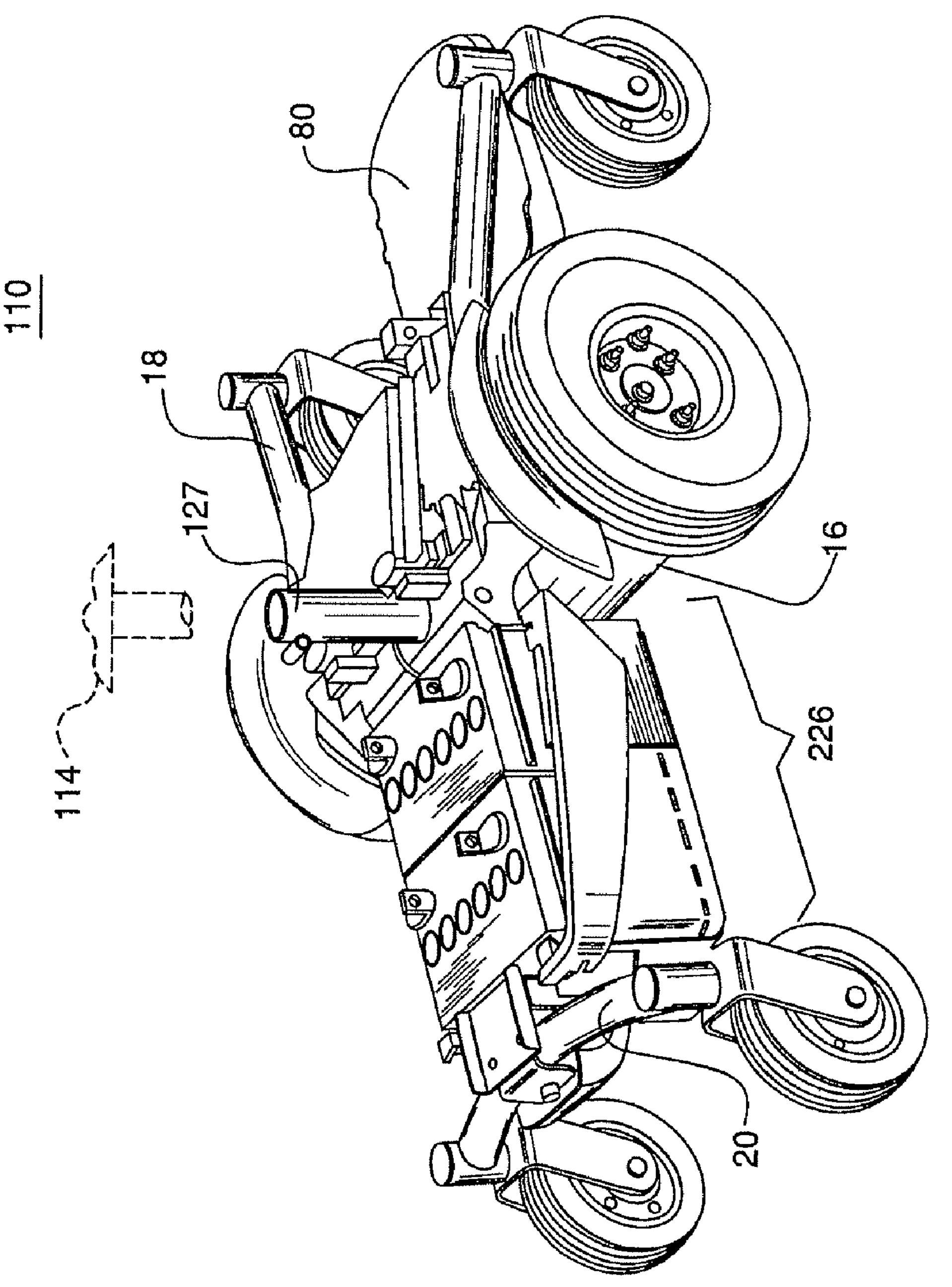
FIG. 19 is a perspective view of a preferred configuration of a battery compartment.
Figure 20:
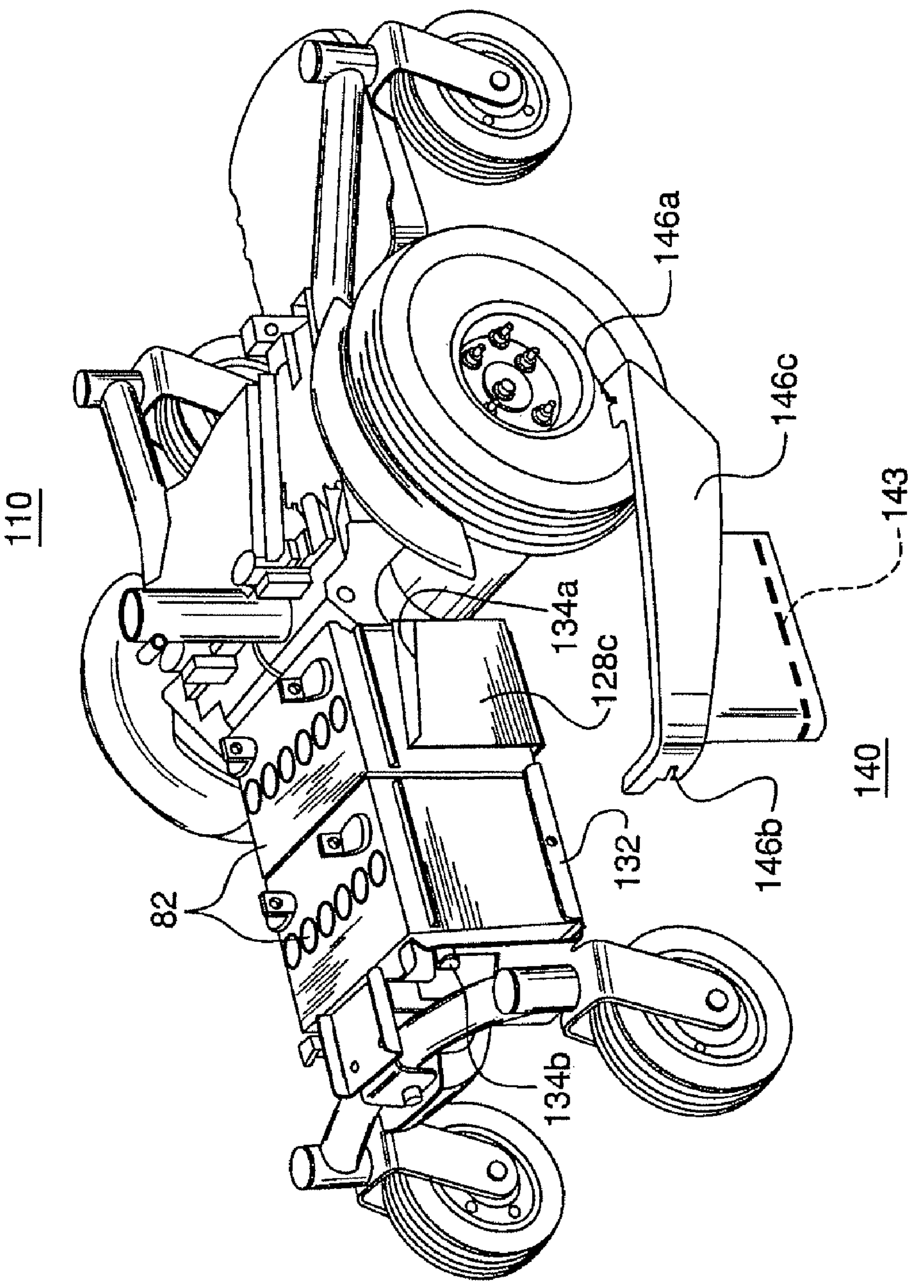
FIG. 20 is the perspective view of the wheelchair shown in FIG. 19 with the cover shown spaced apart from the battery compartment.
Figure 21:
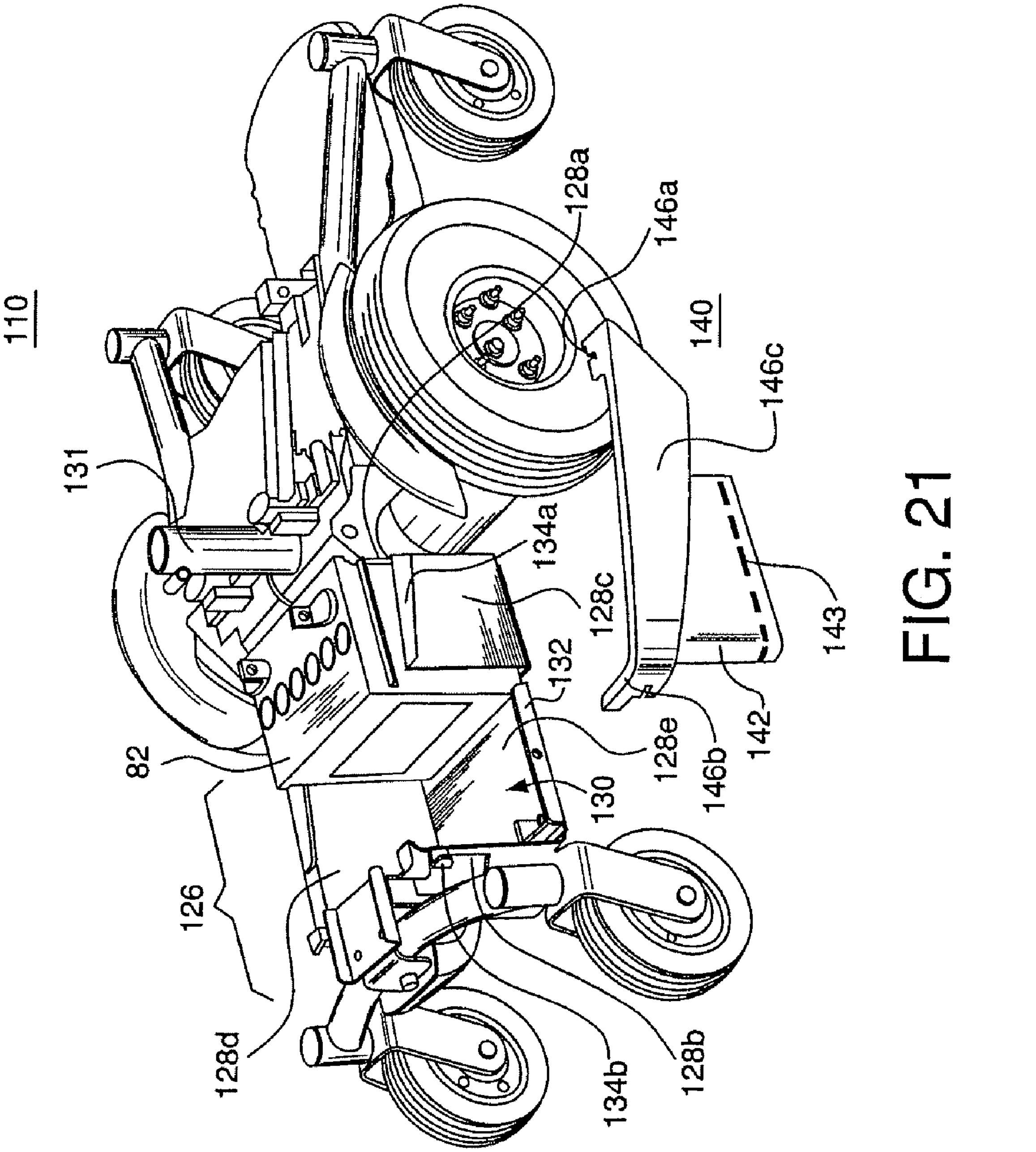
FIG. 21 is the perspective view of the wheelchair shown in FIG. 20 with a battery removed.

According to a second configuration for enabling battery access, a wheelchair 110 is shown in FIGS. 19 through 21. Wheelchair 110 includes a frame assembly 12, a chair assembly 114, a drive assembly 16, a front pivot assembly 18, and a rear wheel assembly 20. Frame assembly 12, drive assembly 16, and rear wheel assembly 20 are generally the same as described for first wheelchair embodiment 10 except as explained immediately below.

Chair assembly 114 is shown only schematically in FIG. 19 (for clarity) and may be conventional. A support post 127 extends upwardly such that a post of chair assembly 114 slips into support post 127. Even though the inventors contemplate that chair assembly 114 may be removed from the remainder of wheelchair 110 for some purposes by sliding it out of support post 127, the configuration of battery compartment 126 preferably enables access and removal of the batteries without removing chair assembly 114 from the remainder of the wheelchair.

As best shown in FIGS. 20 and 21, battery compartment 126 preferably is generally box-like and includes a front wall 128*a*, an opposing rear wall 128*b*, a pair of opposing sidewalls 128*c* and 128*d*, and a floor 128*e*. One of the sidewalls 128*c* has an opening 130 formed therein that preferably has a width the enables removal of at least one of the batteries 82. Preferably, a lip 132 extends up from floor 128*e*. Lip 132 may retain a battery 82 by preventing it from unintentionally sliding out of opening 130. A removable cover 140 may be affixed to 126 battery compartment or otherwise cover opening 130.

Battery compartment 126 may include a substantially flat front flange 134*a* that extends from sidewall 128*c* and a substantially flat rear flange 134*b* that extends from rear wall 128*b*. Front flange 134*a* may be approximately horizontal or have another orientation to enable it to mate to a front portion of cover 140. Rear flange 134*b* may be approximately vertical to enable it to mate to a rear portion of cover 140. Each of flange 134*a* and 134*b* includes a hole or slot through which a bolt or screw may be inserted.

Cover 140 includes a panel 142 and a bracket 144. Panel 142 has approximately the same dimensions as opening 130 and panel 142 may be located over opening 130. Preferably, the bottom edge of panel 142 includes a longitudinal groove 143, which is shown schematically by dashed lines in FIG. 20. Lip 132 is inserted into groove 143 to retain cover 140. Opening 130 may extend also laterally such that the right, rear corner of compartment 126 is open. Accordingly, cover 140 may have a bend to cover the right rear corner portion of opening 130.

Cover 140 may be structural such that it retains or helps retain batteries 82 within battery compartment 126 or it may be primarily decorative such that lip 132 retains batteries 82. And the present invention is not limited to the particular size of panel 142, but rather encompasses a panel that is larger than the opening, a panel that is smaller than the opening, and even covers that do not have a panel. As used herein, the term "located over" when used with reference to a cover generally describes the spatial relationship between the cover to the opening.

Bracket 144 includes a front bracket tab 146*a*, a rear bracket tab 146*b*, and a main bracket member 146*c* that spans between tabs 146*a* and 146*b*. Front bracket tab 146*a* may be approximately horizontal or otherwise arranged to match or mate with compartment front flange 134*a*. Rear tab 146*b* has a bend such that it wraps around the rear of battery compartment 126 and matches or mates with compartment rear flange 134*b*. Preferably, tabs 146*a* and 146*b* are attached to flanges 134*a* and 134*b*, respectively, by wing nuts, thumbscrews, or like fasteners. A bracket, cowling, or like structure that has the same general shape as main bracket member 146*c* may be provided on the opposite side of wheelchair 110 to balance the appearance.

To access the batteries, the fasteners (not indicated in the figures) may be removed from cover 140, and cover 140 may be tilted outwardly or lifted such that lip 132 is removed from groove 143. The rear-most battery 82 may then be lifted over lip 130 and removed from compartment 126 by sliding. The front-most battery 82 may then be moved rearward and then removed by sliding. Preferably, the batteries can be removed without removing the chair and even without tilting the chair forward. The present invention encompasses a combination of accessing the batteries from the side of the wheelchair and tilting the chair forward.

The position of the batteries relative to chair assembly 114 aids in their removal. For example, preferably the batteries are generally located to the rear of the drives, and more preferably every portion of the batteries is located to the rear of the centerline of the drive wheel axis or entirely to the rear of the entire drives. Preferably, the support post attaches to the frame at a point that is rearward of a centerline of the drives and forward of the battery compartment.

Battery compartment 126 has been described with reference to a wheelchair 110 having castors as described for first embodiment wheelchair 10, but battery compartment 126 and the related method of accessing and removing batteries 82 may, of course, be employed with a wheelchair that employs raised anti-tip wheels as described for the second embodiment 10'. Wheelchairs 10 and 10' are described more fully below.

Wheelchair 10 includes a pair of drive assemblies 16 and pivot assemblies 18. Preferably, the left combination of drive assembly 16 and pivot assembly 18 is the mirror image of the right combination of drive assembly 16 and pivot assembly 18. For convenience, only one of each assembly drive 16 and pivot assembly 18 is described in detail herein, as it is clear that the description applies equally to each one of the left and right assemblies 16 and 18.

Drive assembly 16 includes a pair of drives 50, each of which includes a motor 52 and a gearbox 54, a mounting plate 56, and a pair of drive wheels 58. Drive assembly 16 is pivotally coupled to frame assembly 12 by the pivot 29 between frame structure 24 and mounting plate 56. Motor 52 preferably is oriented with its centerline (that is, the central axis of its output shaft) parallel to the output shaft of gearbox 54, which is coupled to a drive wheel 58 as shown in the figures. A longitudinal centerline of the output shaft of gearbox 54 is collinear with the drive wheel rotational axis, which is designated C-DW. Motor 52 may be oriented such that its centerline is collinear with or as shown in the figures—is parallel to, but offset from, drive wheel rotational axis C-DW and the output shaft of gearbox 54.

Drives 50 preferably are mounted transverse to the direction of translation of the wheelchair. As illustrated by arrow F shown for example in FIG. 6A, the direction of translation is parallel to a ground plane surface 200 on which the wheelchair moves forward and perpendicular to the rotational axis C-DW of the drive wheels. The transverse axis is parallel to the axis of rotation of the drive wheels and parallel to the level ground. As used herein, the orientation of rotational or pivotal axes are based on the wheelchair at rest on level ground surface 200 with all wheels oriented to roll straight forward (direction F). Also, the present invention encompasses motors 52 having a centerline (that is, the central axis of its output shaft) that is not parallel to the drive wheel rotational axis C-DW. The present invention (that is, as recited in a claim) is not limited to any relationship or orientation of any part of the drive relative to the frame unless such relationship or orientation is explicitly set forth in the claim.

Drive 50 is rigidly affixed to mounting plate 56. Mounting plate 56 preferably is planar and oriented perpendicular to rotational axis C-DW of drive wheels 58. As best shown in FIGS. 3A, 3B, 4A, and 4B, mounting plate 56 includes a mounting portion 57*a* to which drive 50 is coupled and a projection 57*b* that extends forward and downward. Preferably, gearbox 54 is bolted onto mounting portion 57*a*. Projection 57*b* houses a portion of a pivot 29 for pivotally connecting mounting plate 56 to pivot support 25*d* of frame 24.

Figure 22:
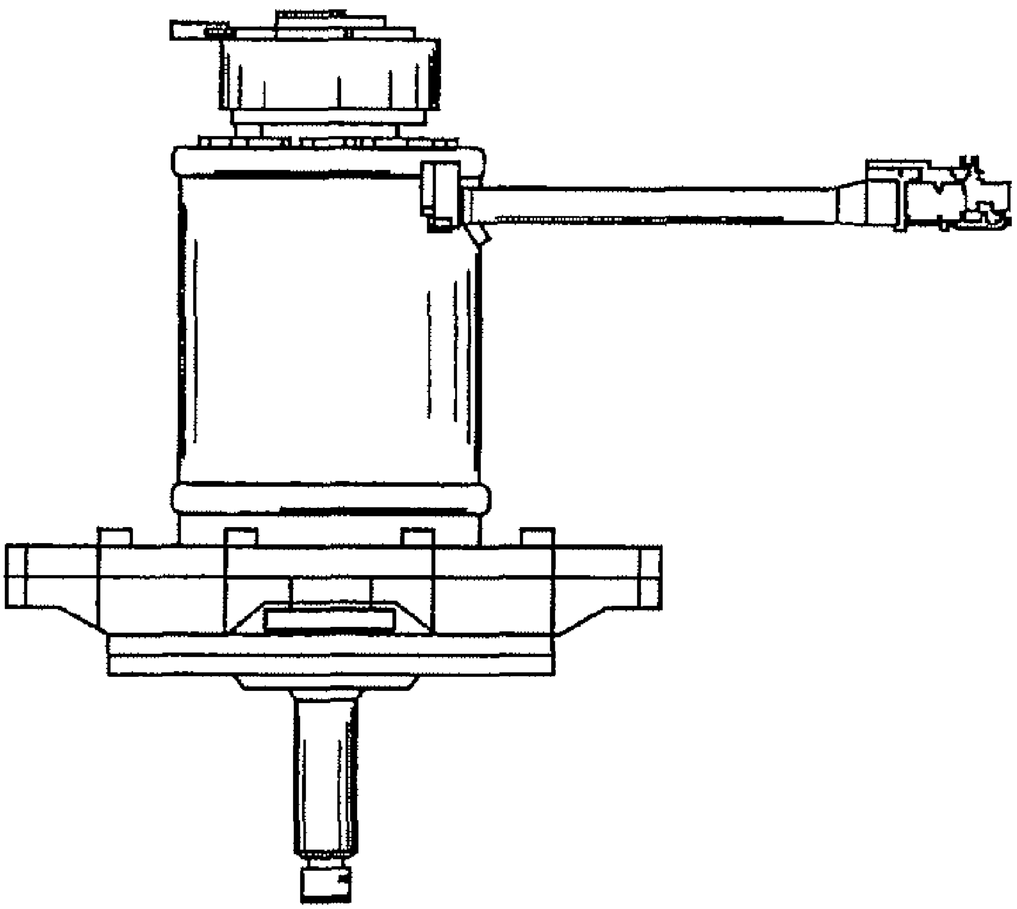
FIG. 22 is a view of the preferred drive.
Figure 23:
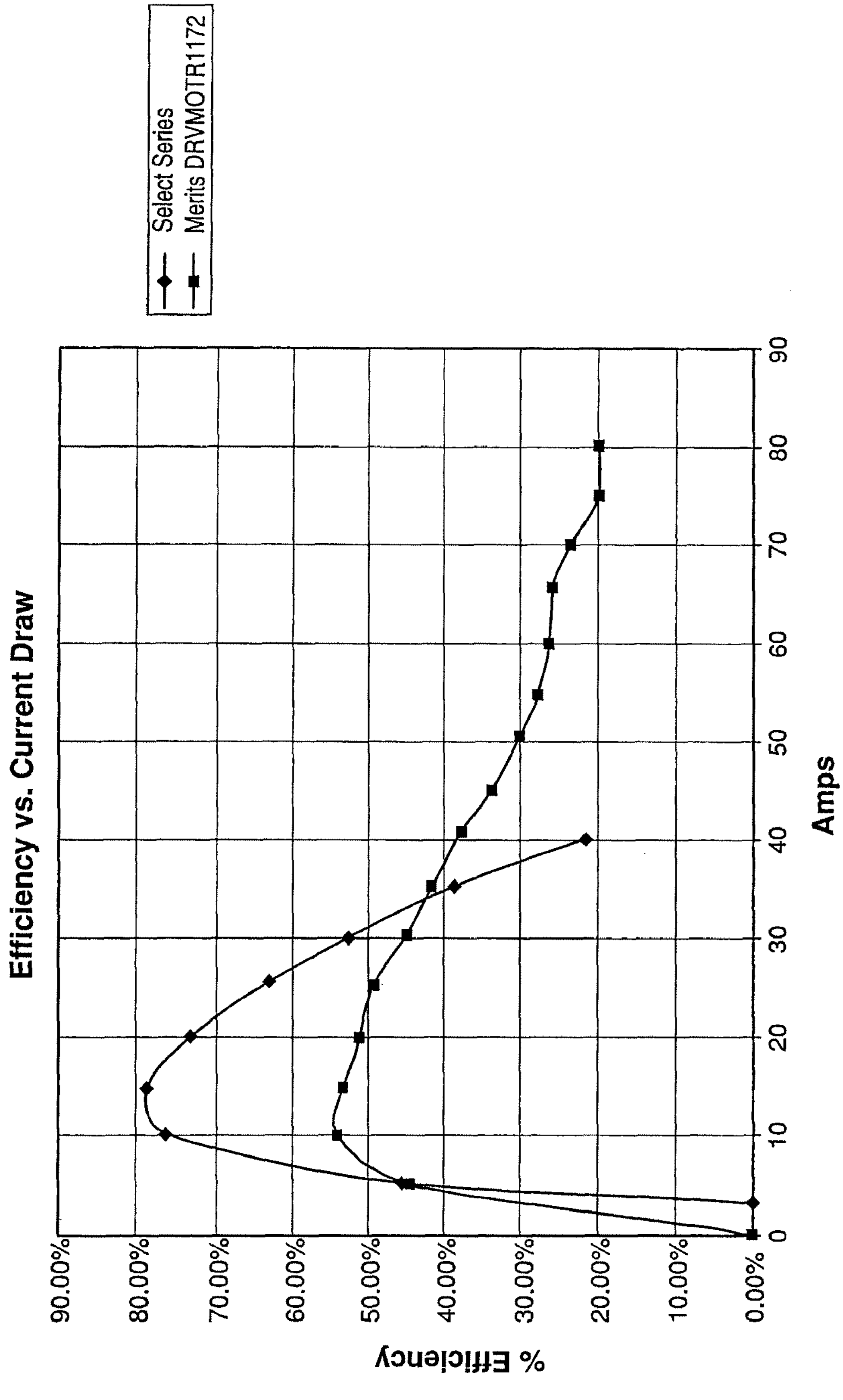
FIG. 23 is a graph of output efficiency versus current draw for a preferred drive and a conventional drive.
Figure 24:
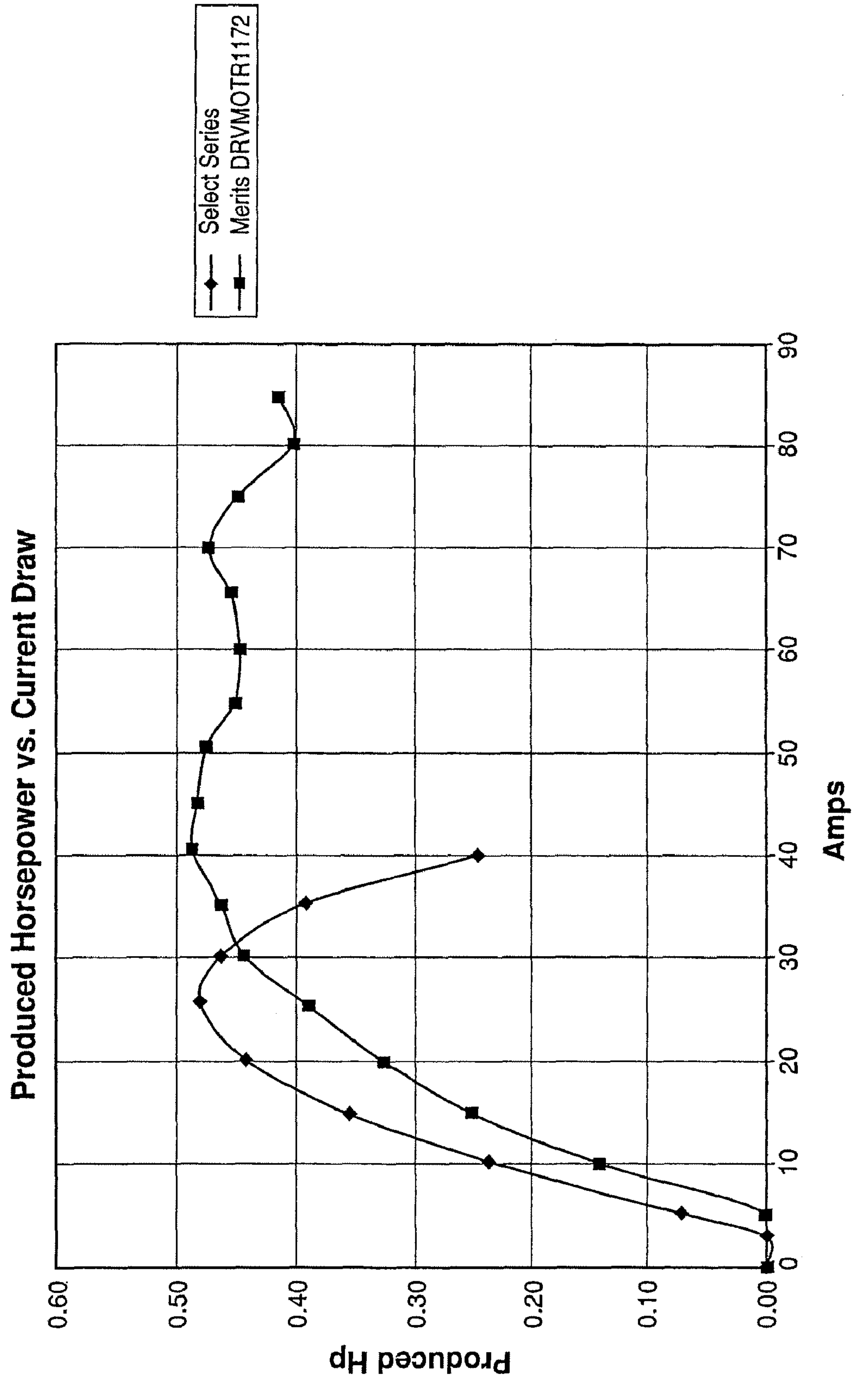
FIG. 24 is graph of output horsepower versus current draw for a preferred drive and a conventional drive.
Figure 25:
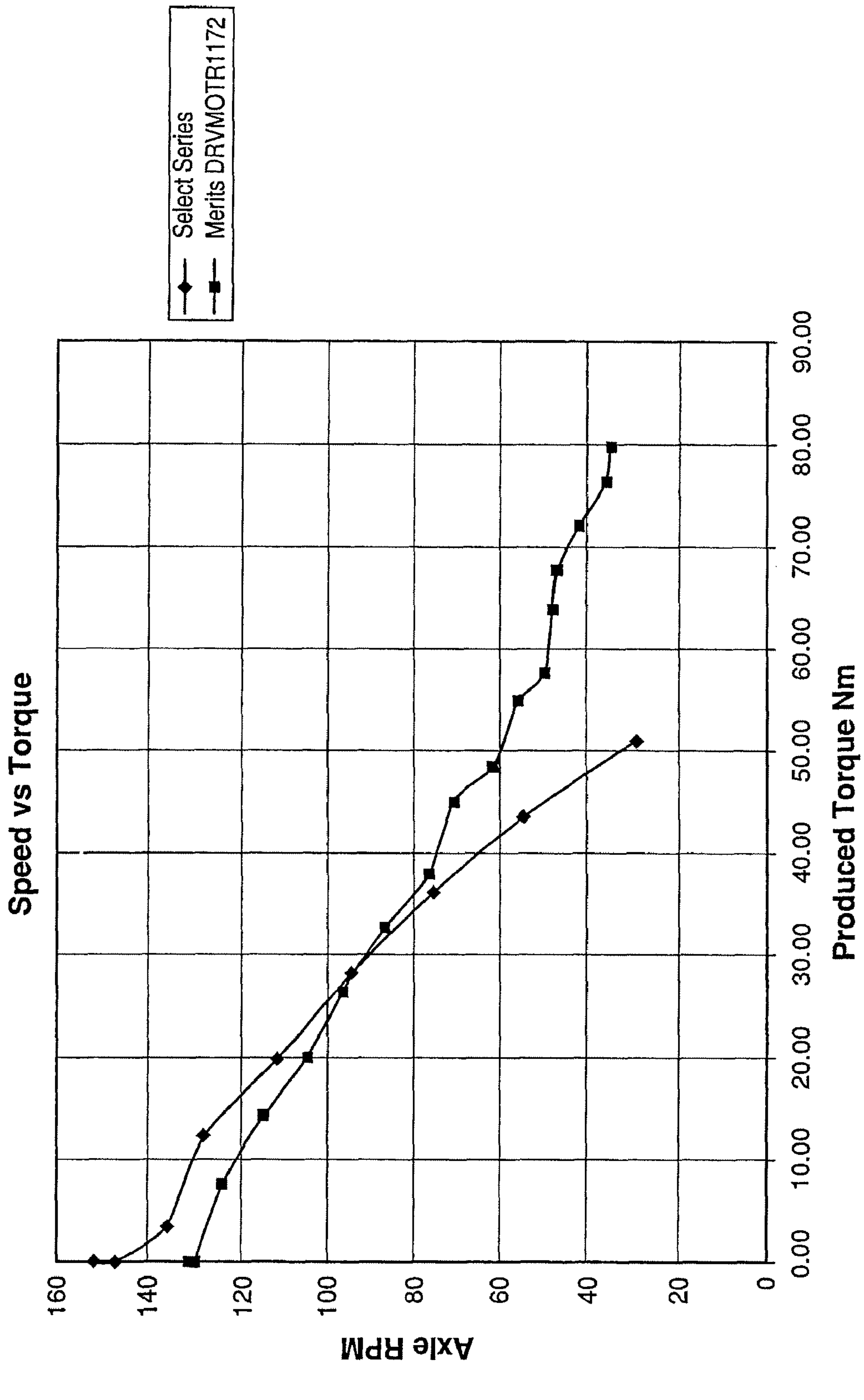
FIG. 25 is a graph of output speed versus torque for a preferred drive and a conventional drive.
Figure 26:
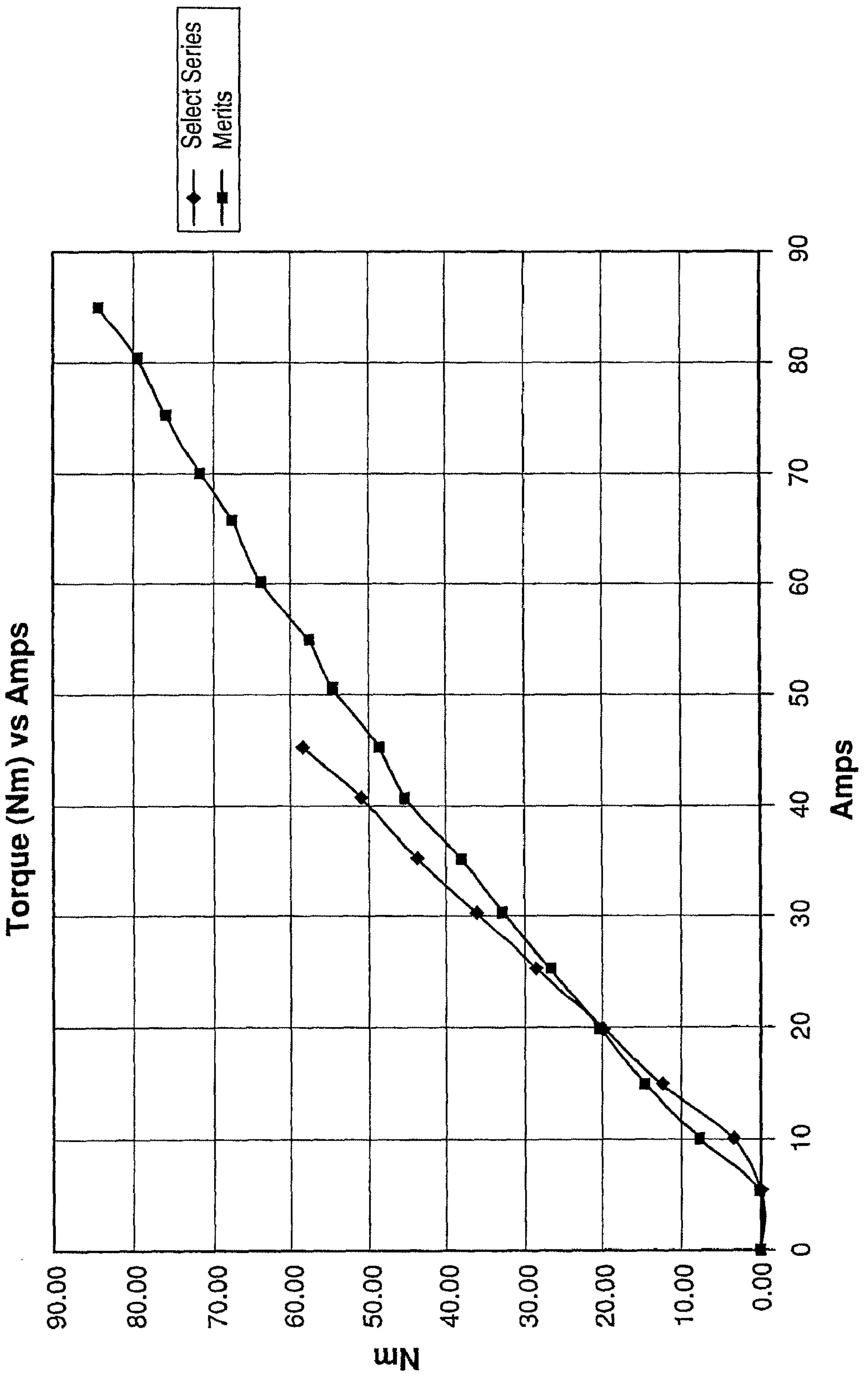
FIG. 26 is a graph of output torque versus current draw for a preferred drive and a conventional drive.

The configuration of drive 50 aids in locating battery compartment 126, but is not required to obtain the benefits of the inventive aspects of wheelchair 10. The configuration of drives 50 also provides improvement in efficiency compared with conventional right angle drives. Preferably drive 50, which is shown in FIG. 22, includes a 24 volt DC motor rated for 3.0 amps and a single reduction gearbox having a reduction ratio of 17.75:1. The no-load speed rating is 166 rpm. FIGS. 23 through 26 illustrate some benefits of preferred drive 50 compared with a conventional worm-gear, right angle drive having a 4500 rpm motor rated for 2.1 amps (at no load) and a 32:1 gear ratio. FIG. 23 is a graph of output efficiency versus current draw; FIG. 24 is graph of output horsepower versus current draw; FIG. 25 is a graph of output speed versus torque; and FIG. 26 is a graph of output torque versus current draw. Because of the higher efficiency of the preferred drive 50, a smaller motor may be used.

Pivot assembly 18 includes a front arm, such as castor arm 60, a swivel bearing 62, a castor support 64, and a castor wheel 66. Castor arm 60 is rigidly coupled to drive 50 via motor mounting plate 56. Preferably, a rearward end of castor arm 60 is affixed to an upper portion of mounting plate 56. Bearing 62 preferably has a barrel that is oriented vertically to enable castor wheel 66 to swivel or turn about a vertical axis to enhance the capability of wheelchair 10 to turn. Castor support 64 includes a fork on which an axle or bearing of castor wheel 66 is fixed.

Rear wheel assembly 20 includes an articulating beam 70 that is coupled to frame 24 at mounting plate 25*f*, a pair of swivel bearings 72, a pair of rear castor supports 74, and a pair of rear castors 76. Beam 70 is coupled to mounting plate 25*f* by any means that enables beam 70 to articulate to adapt to changes in the ground. The articulating structure and function are of rear castor beams are well-known. Bearings 72 are disposed on distal ends of beam 70, and each preferably includes a barrel that is vertically oriented to enable the corresponding castor 76 to swivel or turn to enhance the capability of wheelchair 10 to turn. Castor support 74 includes a fork on which an axle or bearing of castor wheel 76 is fixed.

Support post 27, and preferably the connection between support post 27 and frame 24, is disposed rearward of drive motors 5, preferably generally rearward of drive assembly 16, and preferably rearward of the drive wheel axis of rotation C-DW. The connection between support post 27 and frame 24 may be the location at which the load from chair assembly 14 and the passenger is transmitted to frame 24. Battery housing 26, and thus batteries 82 or other power source, preferably is disposed substantially, and preferably entirely, rearward of drive wheel axis C-DW, and preferably substantially, and more preferably entirely, rearward of the support post 27 connection to frame 24. Also, the invention encompasses the center of gravity of batteries 82 or other power source being located rearward of the support 27 connection and/or rearward of drive wheel axis C-DW.

The generally rearward position of battery housing 26 and the capability of seat 30 to move forward (by the mechanisms 32 or 32' or any other mechanism) enables access to the batteries without fully removing seat 30. In this regard, the wheelchair cover, which typically covers the batteries and mechanical components, may be removable or configured with a hatch (not shown in the figures) to enable direct access to the batteries. Also, the generally rearward position of battery housing 126 enables access to the batteries without moving seat 230. No aspect of the present invention is limited to enabling access to batteries 82 as described herein, unless such limitation is expressly recited in the claim.

The loads borne by frame 24 are transmitted to the ground via drive wheels 58, front castors 66, and rear castors 76. As will be clear to people familiar with wheelchair design, the location of pivot 29 will affect the weight distribution of wheelchair 10. In this regard, the position of pivot 29 forward of drive wheel axis C-DW causes front castors 66 to bear a vertical load while wheelchair 10 is at rest, as mounting plate 56 is supported by drive wheel 58 via its axle. Configuring the wheelchair such that front castors 66 bears a vertical load during steady-speed operation on level ground and/or while at rest on level ground is considered to enhance the stability and stable feel of a wheelchair.

The position of pivot 29 may be chosen to achieve the desired weight distribution and the desired downward load borne by front castors 66. The weight distribution and magnitude of load borne by the castors may be chosen according to such parameters as desired stability of the particular wheelchair during operation on level ground and while ascending and descending a step, motor torque and horsepower, other wheelchair dimensions (such as the horizontal distance from drive wheel axis C-DW to the rear castors), overall wheelchair weight, and like parameters.

For the wheelchair 10 shown in FIGS. 1-4, pivot axis 29 preferably is spaced apart from the front wheel axis by a horizontal dimension that is between 40% and 65%, more preferably between 45% and 60%, and even more preferably about 54% of the horizontal dimension between drive wheel axis C-DW and the front castor axis. Front castors 66 bear approximately 30% of the wheelchair load.

Conventional wheelchairs having front castors often employ springs to bias the castors. The configuration of pivot assembly 18 enables the front suspension of wheelchair 10 to function without a spring bias on castor 66 because of the downward force applied to castors 66 described above. Forgoing biasing springs in the anti-tip wheels eliminates the step of adjusting spring bias for the weight of the wheelchair occupant. The present invention, however, is not limited to wheelchair lacking springs, regardless of the type of front wheels employed.

Referring to FIG. 6A to illustrate a preferred horizontal relationship of some components, drive wheel axis C-DW has a height H1, a centerline of pivot 29 defines a pivot axis C-P that has a height H2, and a centerline of front castor 66 defines a front castor axis C-FC that has a height H3. The terms "height" and "vertical height" as used herein refer to a vertical measurement from a level, even ground surface and, unless clearly identified by the context, measured with the wheelchair in its at-rest position. Preferably, front castor axis height H3 is approximately the same as or more than pivot axis height H2.

Referring again to FIG. 6A to illustrate operation of wheelchair 10 while ascending from a level ground surface 200 up a curb, such as a step 201 having a face 202, a corner 203, and an upper surface 204. Wheelchair 10 may be driven forward until front castor 66 contacts face 202 or, as shown in FIG. 6A, corner 203. Applying torque to drive wheels 58 urges front castor 66 against corner 203. For a step height H4 that is less than front castor axis height H3, front castor 66 overcomes step 201 because of a force couple created by horizontal components of the driving force of wheelchair 10 and a reaction force from step 201. Also, in embodiments in which the front castor height H3 is greater than pivot height H2, a vertical, upward component of the reaction force or impulse applied at the wall tends to raise castor 66. This upward force also enables or enhances wheelchair 10 to overcome a step having a height that is approximately the same as castor axis height H3.

Figure 6B:
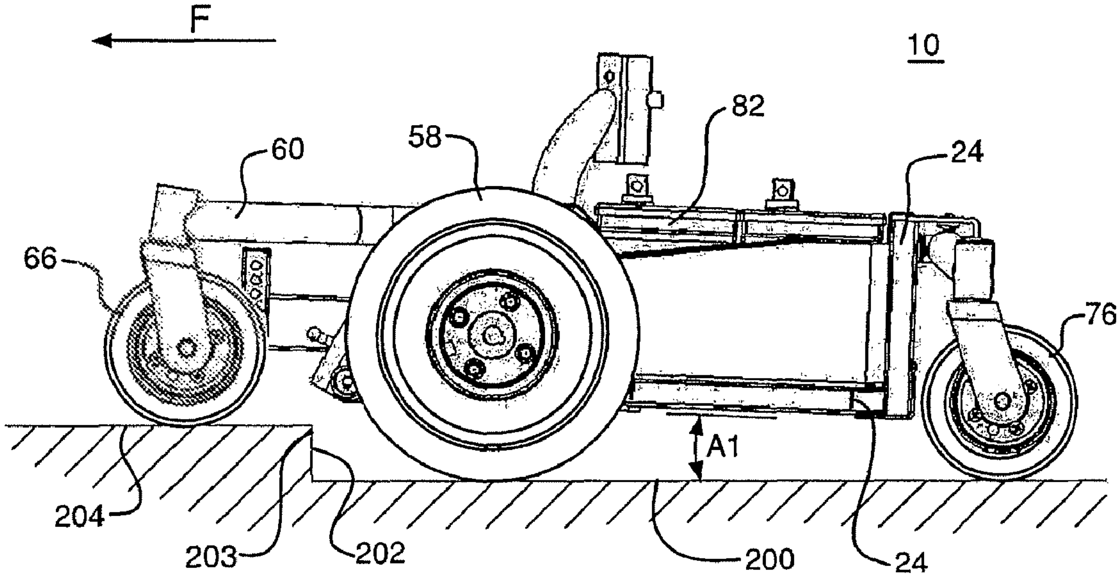
FIG. 6B is a side view of the wheelchair shown in FIG. 6A illustrating the wheelchair ascending a curb.

FIG. 6B illustrates the partially ascended position in which front castor 66 is disposed on step upper surface 204 while drive wheel 58 and rear castor 76 are disposed on ground surface 200. Front arm 60 and mounting plate 56 have been pivoted clockwise (as oriented in FIG. 6B) from the at-rest position in which all six wheels are in contact with ground surface 200. In the position shown in FIG. 6B, frame 24 of wheelchair 10 tips slightly upward from its at rest position, as mounting plate 56 pivots—clockwise as oriented in FIG. 6B—about drive wheel axis C-DW. In this regard, front arm 60 pivots as castor 66 moves from ground surface 200 to step upper surface 202, and the corresponding pivoting of mounting plate 56 about drive wheel axis C-DW results in a corresponding pivoting of pivot 29 about drive wheel axis C-DW. Upward movement of pivot 29 results in a upward movement of the forward portion of frame 24. For the embodiment shown in FIG. 6B, frame 24 tips by an angle A1 of approximately 2.5 degrees upon front castor 66 initially touching lower surface 212.

Figure 6C:
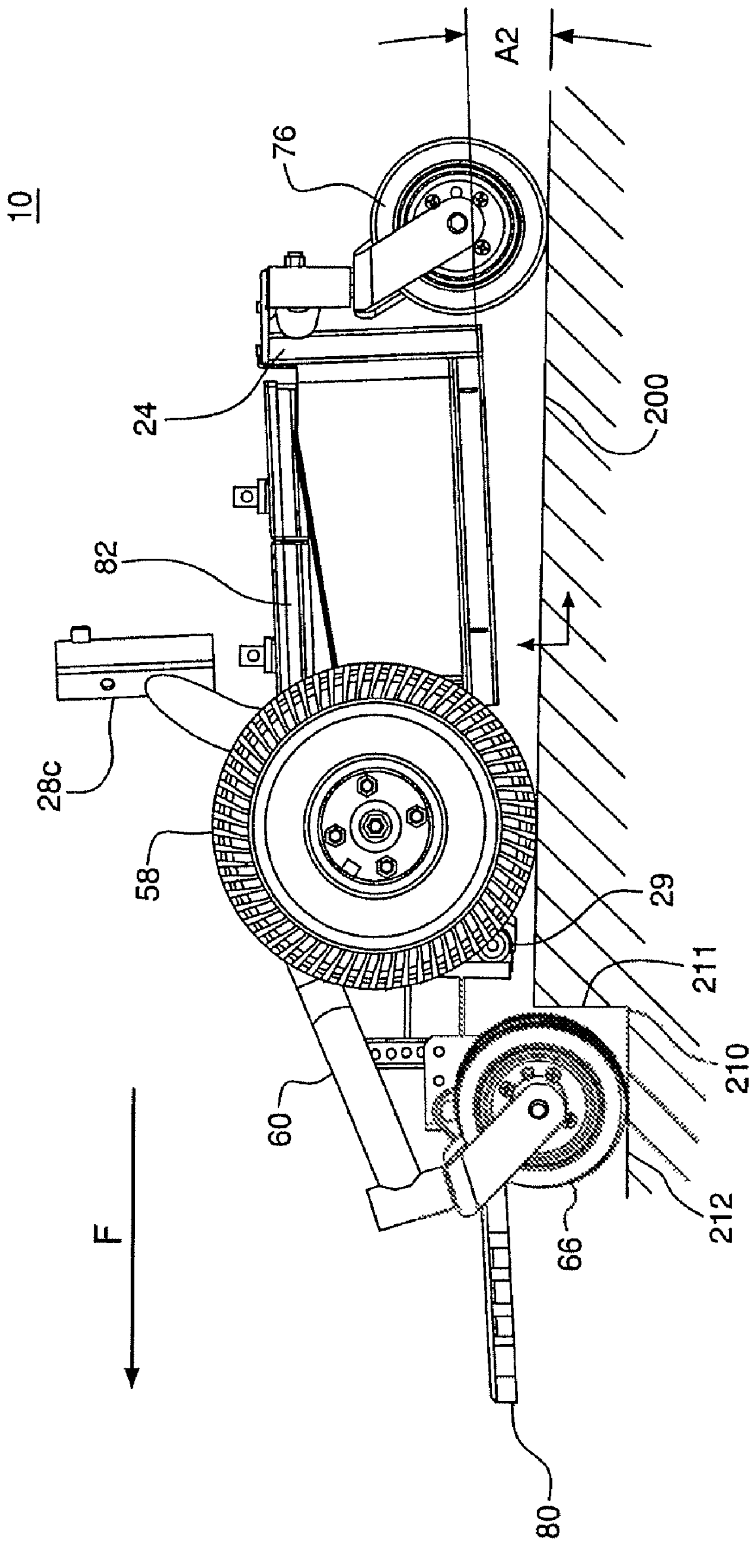
FIG. 6C is a side view of the wheelchair shown in FIG. 6A illustrating the wheelchair descending a curb.

FIG. 6C illustrates wheelchair 10 in the process of descending a step 210, which includes a face 211 and a lower surface 212. Front castor 66 is shown on the lower surface 212 of the step and drive wheels 58 and rear wheels 76 are on the ground surface 200. As castor 66 is driven over the lip of step 210, front castor 66 is urged from the upper surface 100 to the lower surface 212 by the downward force from frame 24 transmitted to plate 56 via pivot 29.

In the position shown in FIG. 6C, frame 24 of wheelchair 10 tips slightly forward from its at rest position, as mounting plate 56 pivots—counterclockwise as oriented in FIG. 6C—about drive wheel axis C-DW. In this regard, front arm 60 pivots as castor 66 moves from step upper surface 200 to step lower surface 212, and the corresponding pivoting of mounting plate 56 about drive wheel axis C-DW results in a corresponding pivoting of pivot 29 about drive wheel axis C-DW. Downward movement of pivot 29 results in a downward movement of the forward portion of frame 24. For the embodiment shown in FIG. 6C, frame 24 tips by an angle A2 of approximately 3 degrees upon front castor 66 initially touching lower surface 212.

FIGS. 7A, 7B, 8A, 8B, and 9 illustrate the second embodiment, a wheelchair 10' includes a frame assembly 12', a chair assembly 14', a drive assembly 16', a front pivot assembly 19, and a rear wheel assembly 20'. Structure of wheelchair 10' that corresponds to structure of the first embodiment wheelchair 10 is designated with a prime (') after the reference numeral. Chair assembly 14' is essentially the same as the chair assembly 14 shown in FIGS. 1-5 and 11-13, and rear wheel assembly 20' is essentially the same as rear wheel assembly 20 shown in FIGS. 1-5. Accordingly, descriptions of chair assembly 14' and rear wheel assembly 20' are omitted from the description of second wheelchair embodiment 10'.

Figure 7A:
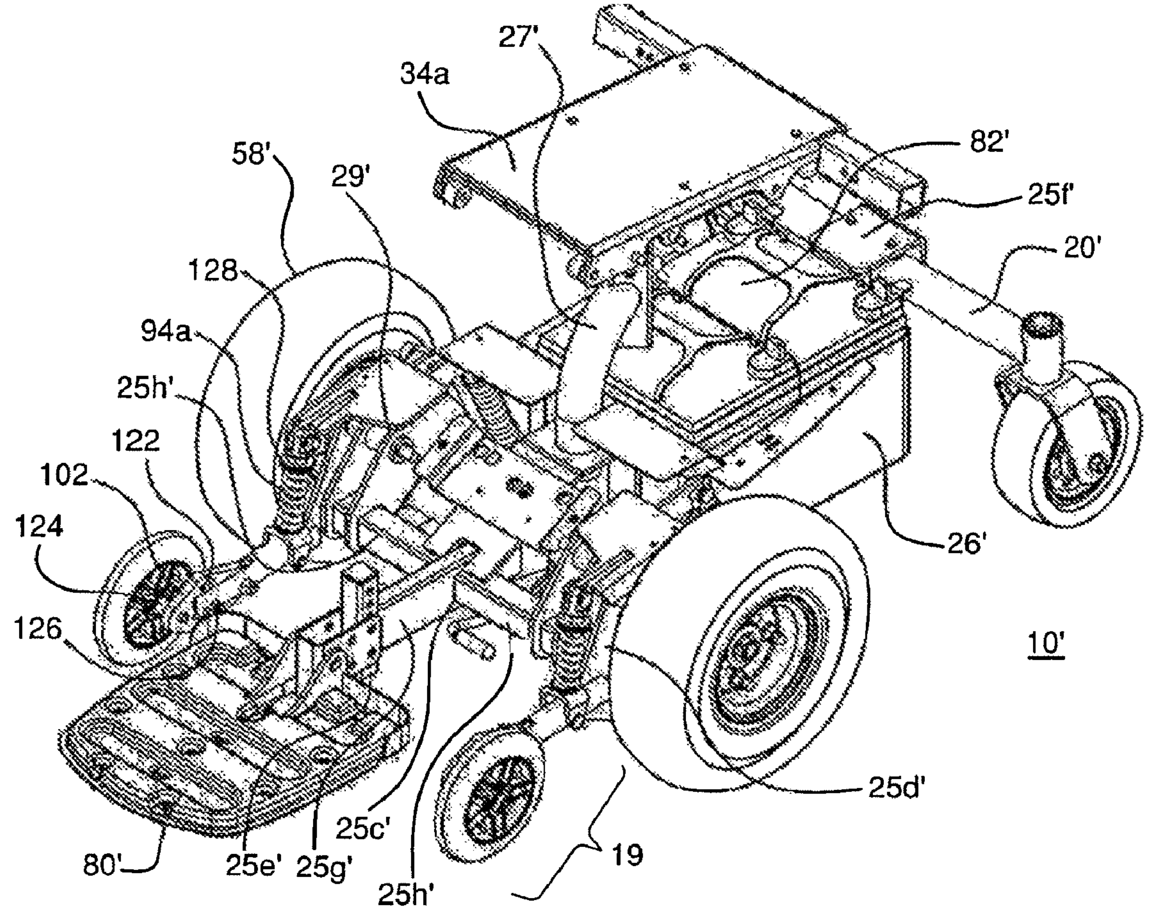
FIG. 7A is a perspective view of another embodiment of a wheelchair with a portion of the chair assembly and cover removed.
Figure 7B:
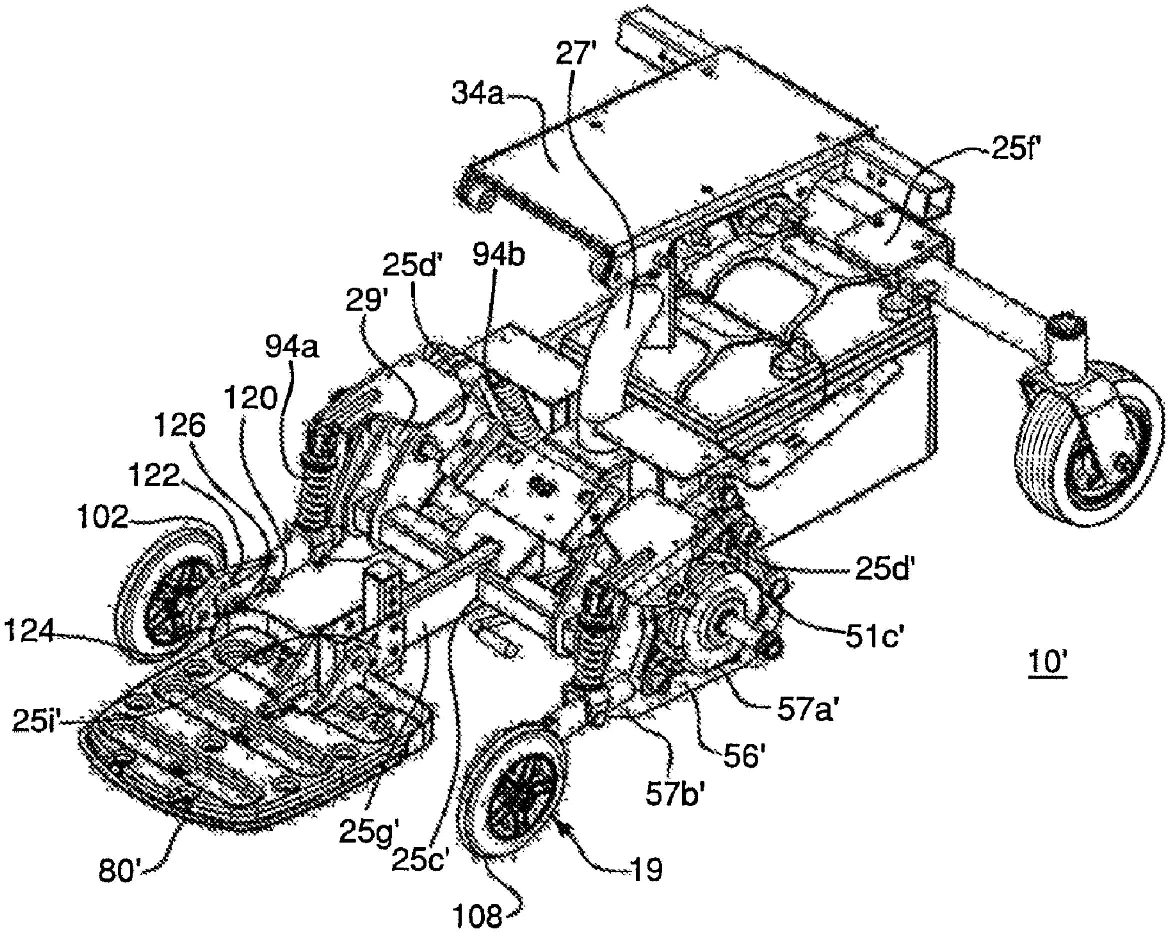
FIG. 7B is a perspective view of the wheelchair of FIG. 7A with the drive wheels and a portion of the mounting plate removed.

Frame assembly 12' in the embodiment shown in FIGS. 7A and 7B is a rigid, box-like structure that is formed of welded and/or bolted square and round tubing and formed plates. The frame structure, which is generally referred to herein by reference numeral 24', includes a central support 25*a*', a rear support 25*b*', a T-shaped support 25*c*', a pair of pivot supports 25*d*', and a footrest support 25*e*'.

Figure 8A:
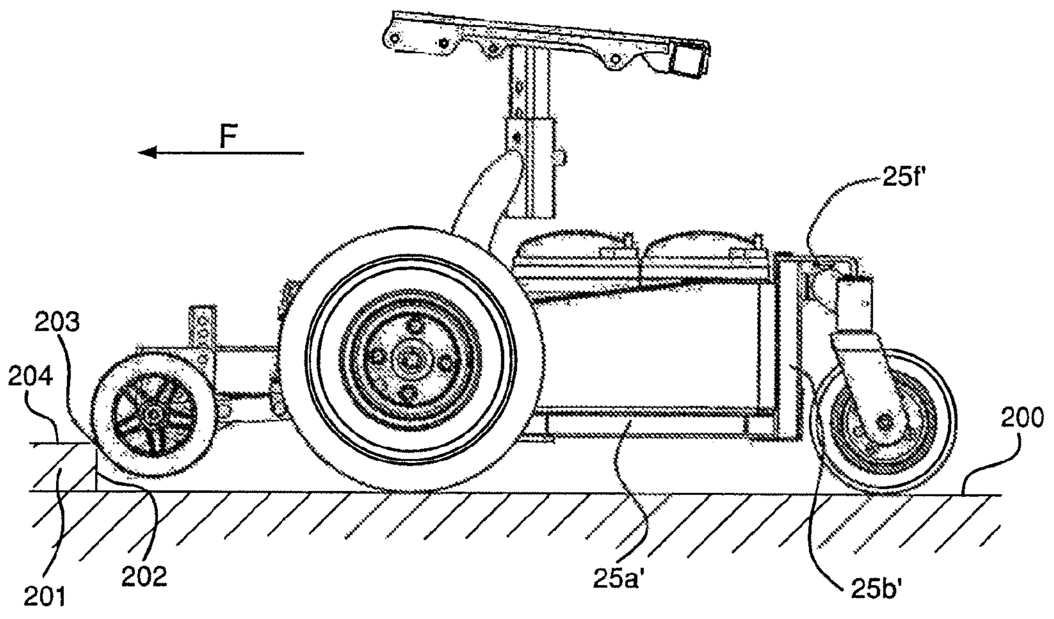
FIG. 8A is a side view of the wheelchair shown in FIG. 7A.
Figure 8B:
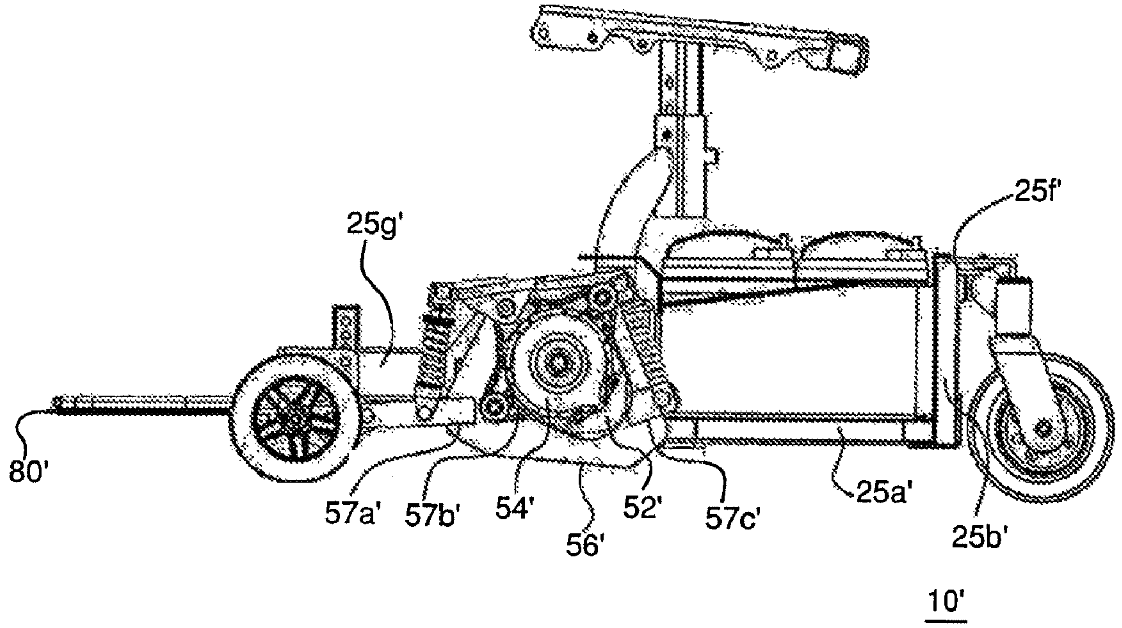
FIG. 8B is a side view of the wheelchair shown in FIG. 7A with the drive wheel and a portion of the mounting plate removed.
Figure 9:
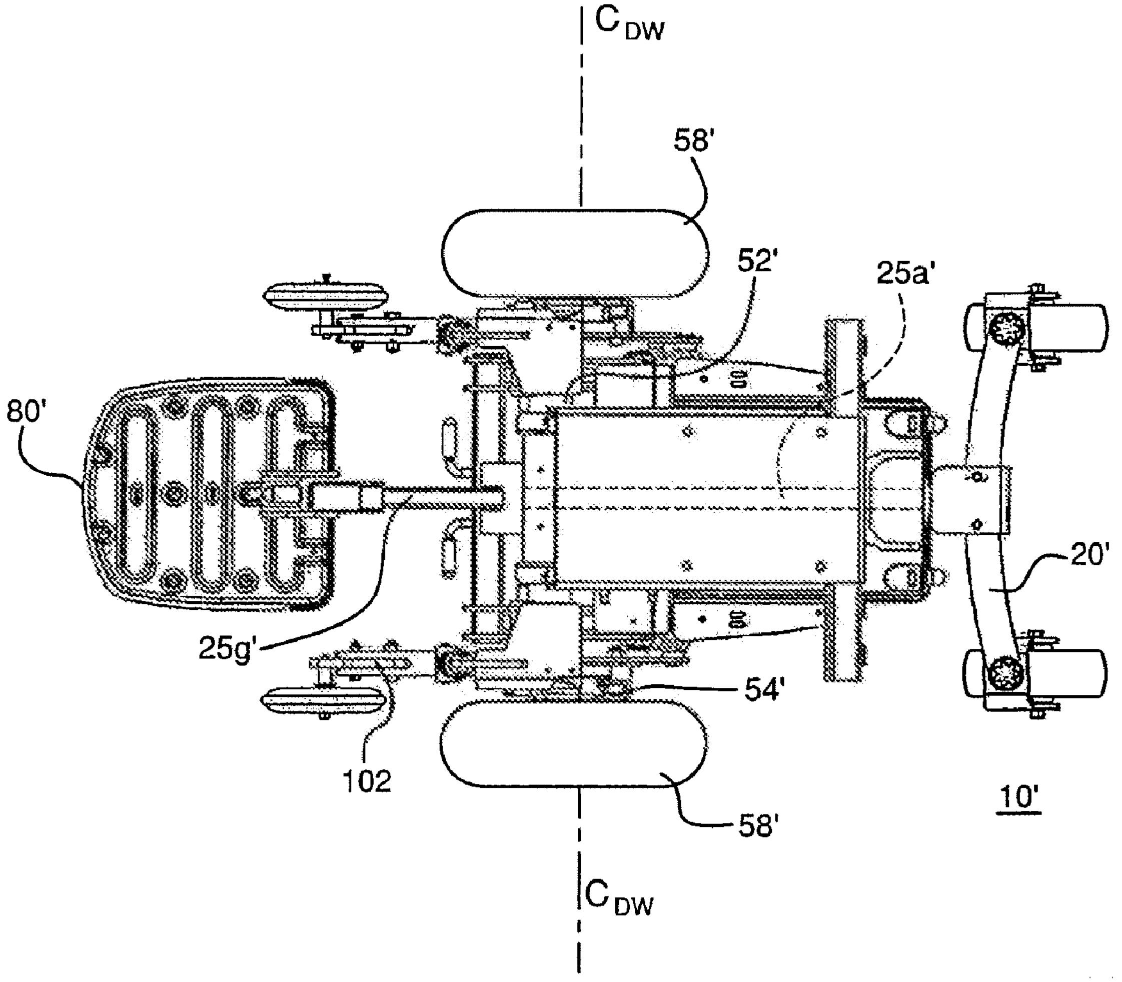
FIG. 9 is a top view of the wheelchair shown in FIG. 7A.

Central support 25*a*', which is best shown in FIGS. 8A, 8B, and (schematically in dashed lines) FIG. 9, is disposed along a horizontal centerline of the wheelchair 10'. Rear support 25*b*', which is shown in FIG. 9, extends upwardly from a rear portion of central support 25*a*' and includes a mounting plate 25*f*'. T-shaped support 25*c*' is disposed above and forward of central support 25*a*' and includes a longitudinal portion 25*g*' and a pair of transverse supports 25*h*'. Pivot supports 25*d*' preferably are substantially vertical plates that extend generally upwardly from transverse supports 25*h*'. Footrest support 25*e*' is disposed at a forward end of longitudinal portion 25*b* of T-shaped support 25*c*. A footrest 80' is coupled to footrest support 25*e*'. A housing 26' for holding batteries 82' and a support post 27' are generally the same as described above with respect to first embodiment wheelchair 10.

Drive assembly 16' of second embodiment wheelchair 10' includes a pair of drives 50', each of which includes a motor 52' and a gearbox 54', a mounting plate 56', and a pair of drive wheels 58'. Motor 52' preferably is oriented with its centerline (that is, the central axis of its output shaft) parallel to the output shaft of gearbox 54', which is coupled to a drive wheel 58' as shown in the figures. A longitudinal centerline of the output shaft of gearbox 54' is collinear with the drive wheel rotational axis, which is designated C-DW. Motor 52' may be oriented such that its centerline is collinear with or—as shown in the figures—is parallel to, but offset from, drive wheel rotational axis C-DW and the output shaft of gearbox 54'. Accordingly, drives 50' preferably are mounted transverse to the direction of translation of the wheelchair. The forward direction of wheelchair translation is indicated in FIG. 8A by arrow F. Also, the present invention encompasses motors 52' having a centerline (that is, the central axis of its output shaft) that is not parallel to the drive wheel rotational axis C-DW unless such relationship is explicitly set forth in the claims.

Drive 50' is rigidly affixed to mounting plate 56'. Mounting plate 56' is pivotally connected to pivot support 25*d*' by pivot 29', as best shown in FIGS. 7A and 7B. Mounting plate 56' preferably is planar and oriented perpendicular to rotational axis C-DW of drive wheels 58'. Mounting plate 56' includes a motor-mounting portion 57*a*' to which drive 50' is bolted, a front projection 57*b*' that extends forward from mounting portion 57*a*', and a rear projection that extends rearward from mounting portion 57*a*'. As explained more fully below, front projection 57*b*' provides a surface for the attachment of the arm of pivot assembly 19; rear projection 57*c*' provides a surface for attachment of a bracket to which a spring is mounted.

Pivot assembly 19 includes a forward-extending front arm, such as fixed wheel or anti-tip wheel arm 90, and a suspension assembly 91. Arm 90 includes a front end 92*a* to which an adjustment plate 102 is connected and a rear end 92*b* that is affixed to front projection 57*b*'.

Adjustment plate 102 includes a pivotable connection 120, holes 122 formed through plate 102, and a bearing mounting 124 to which a front wheel 108 is attached. A bolt or pin 126 extends horizontally through arm front end 92*a* and through one of holes 122. The height of wheel 108 may be adjusted by removing pin 126, pivoting plate 102 up or down to a desired position, and replacing pin 126 into another one of holes 122. The height of wheel 108 may be adjusted to be closely spaced apart from ground plane surface 200 or adjusted such that the rotational axis of wheel 108 is higher than an expected curb height. In general, the purpose, procedure, and desired position for adjusting the height of anti-tip wheels 108 will be understood by persons familiar with wheelchair technology. Adjustment plate 102 is shown for illustration, and the present invention is not limited to wheelchairs having a front wheel height adjustment nor to a particular configuration of a height adjustment mechanism.

Suspension assembly 91 preferably includes a front spring 94*a* and a rear spring 94*b*. Front spring 94*a* has an upper end that is pivotally connected to a mounting bracket 96*a* that extends from an upper portion of pivot support 25*d*'. A lower end of spring 94*a* is pivotally connected to an intermediate portion of arm 90 between arm front end 92*a* and arm rear end 92*b*, and thus spring 94*a* acts on arm 90 forward of mounting plate 56' and rearward of adjustment plate 102. Rear spring 94*b* has an upper end that is pivotally connected to a mounting bracket 96*b* that extends rearward from pivot support 25*d*' and a lower end that is pivotally connected to a rearward portion 57*c*' of mounting plate 56'. Preferably, front spring 94*a* includes a threaded rod and adjustment nut 128 to adjust the spring force and height of spring 94*a*.

Figure 10:
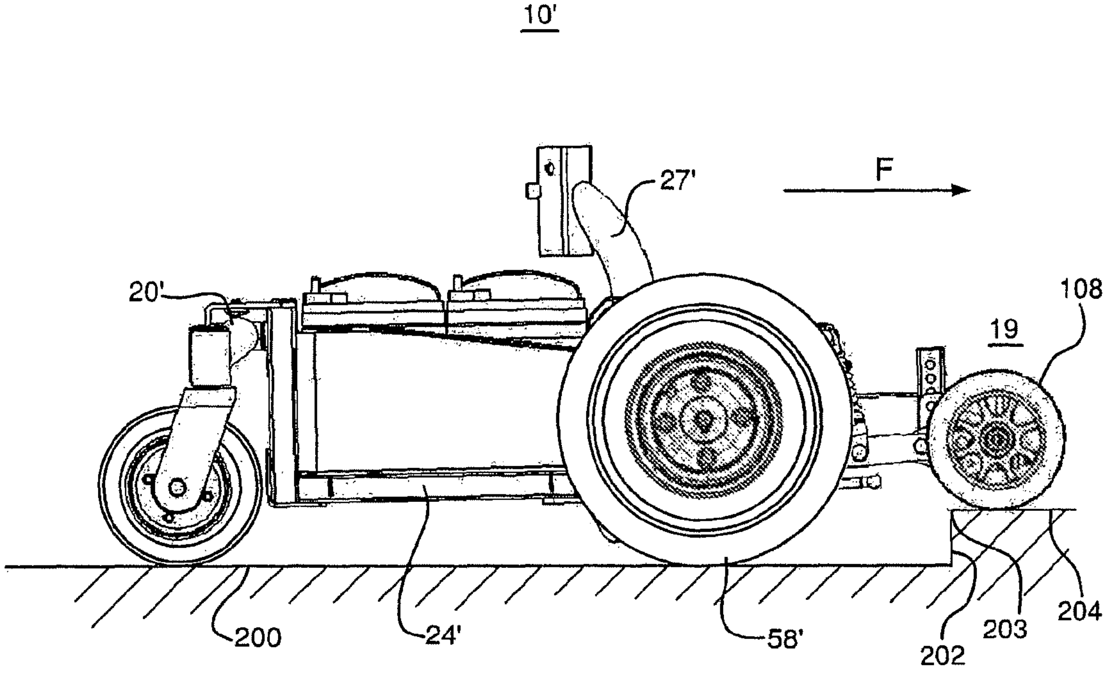
FIG. 10 is a side view of the wheelchair shown in FIG. 7A illustrating the wheelchair ascending a curb.

Springs 94*a* and 94*b* each resist pivoting of mounting plate 56' because of weight of frame 24' and thus position mounting plate 56' and position arm 90. Also, each spring 94*a* and 94*b* resists pivoting of mounting plate 56' in response to contact with an obstacle. In this regard, FIG. 10 illustrates the operation of wheelchair 10' as it encounters a corner 203 of curb 201. Because the height of the axis of fixed wheel 108 is greater than the height of curb 201, wheel 108 rides over curb 201 when urged forward by the wheelchair drive 50'. Arm 90 and mounting plate 56' rotate clockwise (as oriented in FIGS. 8A and 8B) until wheel 108 overcomes corner 203 to reach upper surface 204. Wheelchair 10' continues moving forward until drive wheels 58' contact and overcome curb 201.

Upon initially mounting or ascending curb 201, frame 12' preferably tilts slightly upward. The position of the pivoting connection 29' may be chosen to cooperate with the operation of wheel 108 and drive wheels 58', as will be understood by persons familiar with wheelchair design and configuration in view of the present disclosure. Also, the position of pivot connection 29' enhances the capability of arm 90 of wheelchair 10' to rise relative to the ground in response to an increase in motor torque and/or to wheelchair acceleration. Front castors 66 of first embodiment wheelchair 10 generally remain in contact with the ground surface in response to most applications of motor torque and/or acceleration. The present invention, however, is not limited by the capability or lack of capability of the arms, such as arms 60 or 90, raising in response to application of motor torque, acceleration, or like operations.

The spatial relationship between support post 27', drive motors 52', and batteries 82' is the same as described above with respect to first embodiment wheelchair 10. Accordingly, the capability of chair 30' to move forward enables or enhances access to batteries 82' without fully removing chair 30' from frame 24', as explained more fully above.

The description of wheelchairs 10 and 10' and their respective subsystems is for illustration purposes, and the present invention is not intended to the particular descriptions provided herein, nor is the designation of parts into particular subsystems intended to limit the scope of the invention in any way. For example, the description of the frame assembly does not limit the scope of the invention to devices having a rigid frame, but rather the invention encompasses all frame structures, including those having flexible or movable structure; describing the hinge assembly as a portion of the chair assembly should not be construed to limit the invention to such structure; and describing components of the wheelchair as part of the pivot assembly is not intending to be limiting.

Further, the hinge assembly structure and slide assembly structure for moving the seat, the configuration for enabling access to the batteries without moving the chair, the frame structures, the chair assembly structure, the drive assembly structures, the pivot assembly structures, and rear beam structure are described herein for illustration purposes, and are not intended to limit the scope of the invention except for the particular structure that is explicitly recited in the claim.

We claim:

1. A powered wheelchair comprising:

a frame;

a pair of opposing drives, each drive including a motor and a gearbox, each motor being mounted substantially-transverse to the direction of translation of the wheelchair;

a pair of central drive wheels, each one of the drive wheels coupled to a corresponding one of the drives;

a power supply compartment that is generally located behind the drives, the compartment having a floor, a side opening through which a power supply may be removed, and a lip that extends at least partially into the opening;

a cover that defines a groove, the cover capable of being configured into a first position in which the cover is generally located over the side opening of the power supply compartment and the lip is inserted into the groove so as to retain the cover over the side opening, and a second position in which the cover is removed from the power supply compartment to enable access thereto; and a chair supported on the frame such that the cover is capable of being removed, and the side opening of the compartment is adapted to be accessible for power supply removal without removal of the chair from the frame.

2. The wheelchair of claim 1 wherein the power supply is batteries.

3. The wheelchair of claim 2 wherein the batteries are generally located to the rear of the drives.

4. The wheelchair of claim 3 wherein every portion of the batteries is located to the rear of the drives.

5. The wheelchair of claim 2 wherein the gearbox is a single reduction gearbox.

6. The wheelchair of claim 2 wherein every portion of the batteries is located to the rear of the centerline of a drive wheel axis.

7. The wheelchair of claim 2 wherein the chair is supported on the frame by a single support to which the chair is mounted.

8. The wheelchair of claim 7 wherein the support is a post that attaches to the frame at a point that is behind a centerline of the drives.

9. The wheelchair of claim 7 wherein the support is a post that attaches to the frame at a point that is rearward of a centerline of the drives and forward of the compartment.

10. The wheelchair of claim 2 further comprising a pair of front wheels and at least one rear wheel.

11. The wheelchair of claim 10 wherein the front wheels are castors.

12. The wheelchair of claim 10 wherein the front wheels are anti-tip wheels that are suspended from a ground surface while the wheelchair is at rest.

13. The wheelchair of claim 10, further comprising a pair of arms connecting each front wheel to a respective drive, wherein (i) each drive is pivotally connected to the frame, and (ii) a centerline of a pivot axis of the pivotal connection between the drive and the frame has a vertical height that is approximately the same or less than a vertical height of an axis of rotation of the front wheel.

14. The wheelchair of claim 13, wherein the centerline of the pivot axis of the pivotal connection between the drive and the frame has a vertical height that is approximately the same or less than the vertical height of the axis of rotation of the front wheel when the front wheel and drive wheel are on level ground.

15. The wheelchair of claim 1, wherein the lip extends up from the floor and at least partially across the side opening.

16. The wheelchair of claim 15 wherein the groove is on a lower edge of the cover.

17. The wheelchair of claim 1 wherein the cover includes a panel portion that is approximately the same size as the side opening.

18. The wheelchair of claim 1, wherein the drive wheels are disposed proximate to a middle portion of the frame.

* * * * *